(12) United States Patent
Maher et al.

(10) Patent No.: US 10,880,335 B2
(45) Date of Patent: *Dec. 29, 2020

(54) NETWORK SECURITY SYSTEMS AND METHODS

(71) Applicant: Intertrust Technologies Corporation, Sunnyvale, CA (US)

(72) Inventors: David P. Maher, Livermore, CA (US); Gilles Boccon-Gibod, San Francisco, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,996

(22) Filed: Aug. 7, 2019

(65) Prior Publication Data
US 2020/0137116 A1 Apr. 30, 2020

Related U.S. Application Data

(63) Continuation of application No. 15/951,610, filed on Apr. 12, 2018, now Pat. No. 10,419,492, which is a
(Continued)

(51) Int. Cl.
*H04L 29/06* (2006.01)
*G06F 21/62* (2013.01)
(Continued)

(52) U.S. Cl.
CPC .......... *H04L 63/20* (2013.01); *G06F 21/6218* (2013.01); *H04L 67/1068* (2013.01);
(Continued)

(58) Field of Classification Search
CPC ..... H04L 63/20; H04L 79/1068; H04L 67/16; H04L 12/2803; H04L 63/065;
(Continued)

(56) References Cited

U.S. PATENT DOCUMENTS

| | | |
|---|---|---|
| 2003/0070070 A1 | 4/2003 | Yeager et al. |
| 2003/0236979 A1 | 12/2003 | Himmel et al. |

(Continued)

FOREIGN PATENT DOCUMENTS

| | | |
|---|---|---|
| CN | 101977122 A | 2/2011 |
| EP | 2434461 A1 | 3/2012 |

(Continued)

OTHER PUBLICATIONS

Examination Report No. 1 dated May 7, 2018, issued in Australian Application No. 2015218275.
(Continued)

*Primary Examiner* — Kambiz Zand
*Assistant Examiner* — Benjamin A Kaplan
(74) *Attorney, Agent, or Firm* — Finnegan, Henderson, Farabow, Garrett & Dunner LLP

(57) ABSTRACT

This disclosure relates to systems and methods for managing connected devices and associated network connections. In certain embodiments, trust, privacy, safety, and/or security of information communicated between connected devices may be established in part through use of security associations and/or shared group tokens. In some embodiments, these security associations may be used to form an explicit private network associated with the user. A user may add and/or manage devices included in the explicit private network through management of various security associations associated with the network's constituent devices.

19 Claims, 10 Drawing Sheets

Related U.S. Application Data continuation of application No. 14/624,405, filed on Feb. 17, 2015, now Pat. No. 9,973,535.

(60) Provisional application No. 61/940,182, filed on Feb. 14, 2014, provisional application No. 61/946,404, filed on Feb. 28, 2014.

(51) Int. Cl.
| | | |
|---|---|---|
| *H04L 29/08* | (2006.01) | |
| *H04W 4/70* | (2018.01) | |
| *H04W 12/00* | (2009.01) | |
| *H04W 12/04* | (2009.01) | |
| *H04L 12/28* | (2006.01) | |
| *H04W 12/08* | (2009.01) | |

(52) U.S. Cl.
CPC ........... *H04W 4/70* (2018.02); *H04W 12/003* (2019.01); *H04W 12/04* (2013.01); *G06F 2221/2149* (2013.01); *H04L 12/2803* (2013.01); *H04L 63/065* (2013.01); *H04L 67/16* (2013.01); *H04W 12/08* (2013.01)

(58) Field of Classification Search
CPC ........ G06F 21/6218; G06F 2221/2149; H04W 12/04; H04W 12/08; H04W 4/70; H04W 12/003
USPC .......................................................... 726/1
See application file for complete search history.

(56) References Cited

U.S. PATENT DOCUMENTS

| | | |
|---|---|---|
| 2004/0264697 A1 | 12/2004 | Gavrilescu et al. |
| 2005/0059379 A1 | 3/2005 | Sovio et al. |
| 2009/0037736 A1 | 2/2009 | Djordjrvic et al. |
| 2010/0093278 A1 | 4/2010 | Abel et al. |
| 2011/0078445 A1 | 3/2011 | Xiao et al. |
| 2012/0044057 A1 | 2/2012 | Kang et al. |
| 2012/0072979 A1 | 3/2012 | Cha et al. |
| 2012/0124658 A1 | 5/2012 | Brudnicki et al. |

FOREIGN PATENT DOCUMENTS

| | | |
|---|---|---|
| JP | 2006092371 A | 4/2006 |
| JP | 2011530957 A | 12/2011 |
| JP | 2013507063 A | 2/2013 |
| WO | WO 2010/019353 A2 | 2/2010 |
| WO | WO 2013/003783 A1 | 1/2013 |

OTHER PUBLICATIONS

Examination Report No. 2 dated Sep. 19, 2018, issued in Australian Application No. 2015218275.
Extended European Search Report dated Jan. 19, 2017; EP Application No. 15749529.2 (8 pages).
Final Office Action dated Dec. 30, 2016 for U.S. Appl. No. 14/624,405, filed Feb. 17, 2015.
International Search Report and Written Opinion dated Apr. 30, 2015; PCT Application No. PCT/US2015/016184 (6 pages).
Notice of Allowance and Fee(s) Due dated Jan. 12, 2018 for U.S. Appl. No. 14/624,405, filed Feb. 17, 2015.
Notification of Reasons for Refusal dated Sep. 4, 2018, issued in Japanese Application No. 2016-551179.
Office Action dated Apr. 25, 2016 for U.S. Appl. No. 14/624,405, filed Feb. 17, 2015.
Office Action dated Feb. 22, 2019 and First Search Report dated Feb. 12, 2019, from Chinese Patent Office in China Application No. 201580019898.X.
Office Action dated Jun. 27, 2017 for U.S. Appl. No. 14/624,405, filed Feb. 17, 2015.
Examination Report from corresponding Indian application No. 201637029151 dated Feb. 21, 2020.

NETWORK SECURITY SYSTEMS AND METHODS

RELATED APPLICATIONS

This application is a Continuation of U.S. application Ser. No. 15/951,610, filed Apr. 12, 2018, and entitled "NETWORK SECURITY SYSTEMS AND METHODS," which is a Continuation of U.S. application Ser. No. 14/624,405, filed Feb. 17, 2015, and entitled "NETWORK SECURITY SYSTEMS AND METHODS," which claims the benefit of priority under 35 U.S.C. § 119(e) to U.S. Provisional Patent Application No. 61/940,182, filed Feb. 14, 2014, and entitled "PERSONAL INTERNET OF THINGS SYSTEMS AND METHODS," and to U.S. Provisional Patent Application No. 61/946,404, filed Feb. 28, 2014, and entitled "PERSONAL INTERNET OF THINGS SYSTEMS AND METHODS," all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

Connected devices have become an important part of our lives. As the use of the Internet is increasingly intrinsic to people's daily activities, more personal electronic devices are becoming interconnected. A variety of Internet-connected devices are now available to consumers as part of a connected—device ecosystem—called the Internet of Things ("IoT")—that uses the existing Internet infrastructure. The IoT provides connectivity that makes a variety of computing devices and groups of devices (collectively, "things") more useful. The IoT may also allow for the collection of unprecedented amounts of data relating to a user, thereby facilitating an understanding of a user's environment, behavior, and/or how well various devices associated with the user perform. The IoT may further allow for control and/or automation of various devices, thereby improving the interaction between, and/or the functionality of, a user's devices.

The IoT may be relatively heterogeneous, with connectivity facilitated by a variety of different technologies. Providing trust, privacy, safety, and/or security ("TPSS") within the IoT provides unique challenges, as traditional security and/or security management technologies may be difficult to implement in such a diverse ecosystem. For example, the use of ad hoc networks and/or a variety of control and/or communications paths and/or channels in an IoT, many of which may be hidden from a user, may introduce difficulties in implementing TPSS within the IoT.

The present disclosure relates generally to network security systems and methods. More specifically, but not exclusively, the present disclosure relates to systems and methods for facilitating trust, privacy, safety, and/or security of information communicated between, and the operation of, a variety of connected devices in a network. Systems and methods disclosed herein facilitate TPSS within an ecosystem of connected devices or "things". As used herein, the terms device, connected device, system, entity, and/or thing may, in certain instances, be used interchangeably. In certain embodiments, the systems and methods may be utilized in connection with a personal IoT ecosystem associated with a particular user, entity, and/or a group thereof. Embodiments of the disclosed systems and methods may, among other things, implement TPSS within a diverse ecosystem of connected devices associated with a user, and/or the user's home, vehicle, workplace, and/or the like. For example, certain embodiments of the disclosed systems and methods may be used in connection with any suitable connected device or devices, including, without limitation, security systems; networked locks; thermostats; heating, ventilation, and air conditioning ("HVAC") systems; irrigation systems; water controls; pumps; heaters; home utility meters; home network gateways; activity sensors; alarms (e.g., fire and/or $CO_2$ alarms); connected lighting; connected home appliances (e.g., refrigerators, washing machines, televisions, etc.); connected vehicles; medical and/or personal devices (e.g., activity and/or fitness monitoring devices, pacemakers, insulin pumps, blood sugar monitors, etc.); mobile communication devices; computing devices; and/or any other connected device, as well as associated status and/or data stores.

In some embodiments, TPSS may be established in a personal IoT between various connected devices through the use of security associations and/or shared group tokens associated with a user of the personal IoT. In certain embodiments, these security associations may be used to form an explicit private network associated with the user and/or a personal IoT associated with the user. As detailed herein, in various embodiments a user may add and/or manage devices included in his or her explicit private network through management of various security associations amongst the network's constituent devices.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
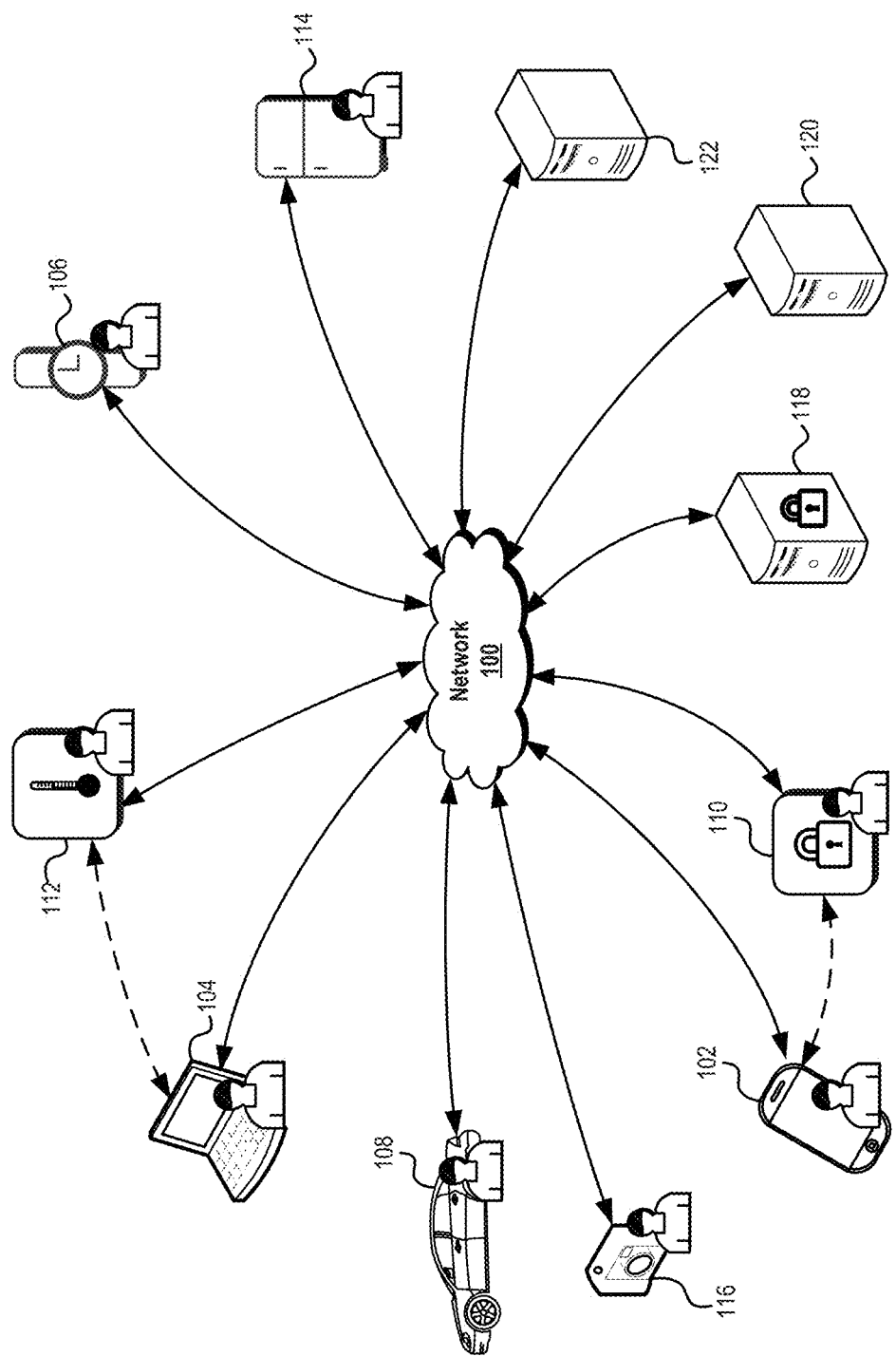
FIG. 1 illustrates an exemplary connected device ecosystem consistent with embodiments of the present disclosure.

A detailed description is provided below of systems and methods consistent with the inventive body of work. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the various embodiments disclosed herein, some embodiments can be practiced without some or all of these details. Moreover, for the purpose of clarity, certain technical material that is known in the related art has not been described in detail in order to avoid unnecessarily obscuring the disclosure.

Various embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of illustrative embodiments of the inventive body of work is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods are presented for facilitating TPSS in a connected device ecosystem, such as an IoT ecosystem. In certain embodiments, the systems and methods described herein can, for example, be used in connection with digital rights management ("DRM") technologies such as those described in commonly assigned, co-pending U.S. patent application Ser. No. 11/583,693 ("the '693 application"), service orchestration and/or DRM technologies such as those described in commonly assigned U.S. Pat. No. 8,234,387 ("the '387 patent"), genetic information storage and/or management technologies such as those described in commonly assigned co-pending U.S. patent application Ser. No. 13/654,349 ("the '349 application"), trusted vehicle technologies such as those described in commonly assigned co-pending U.S. patent application Ser. No. 13/766,432 ("the '432 application"), personalized data management technologies such as those described in commonly assigned co-pending U.S. patent application Ser. No. 14/074,603 ("the '603 application"), content delivery technologies such as those described in commonly assigned co-pending U.S. patent application Ser. No. 12/785,406 ("the '406 application"), and/or information targeting technologies such as those described in commonly assigned co-pending U.S. patent application Ser. No. 13/946,750 ("the '750 application")(the contents of '693 application, the '387 patent, the '349 application, the '432 application, the '603 application, the '406 application, and the '750 application hereby being incorporated by reference in their entireties), as well as in other contexts. It will be appreciated that these systems and methods are novel, as are many of the components, systems, and methods employed therein.

Consistent with embodiments disclosed herein, establishing appropriate TPSS methodologies in a connected device ecosystem such as a personal IoT may involve analyzing one or more of the following:

What principals are involved in a personal IoT? That is, what entities—people, processors, devices, services, programs, etc.—are involved in the system as actors that may require access to other entities and associated data?

How are these principals identified, and what mechanisms may be used to ensure that a principal's identity can be trusted?

What system resources may be governed and protected, and what mechanisms should be used to do so?

What principals may be authorized to access which resources, under what conditions, and for what purposes?

What entities may be trusted to set policy around resource usage, the authorization (and identification) of system principals, and overall ecosystem deployment and management? That is, what entity or entities may act as roots of trust or as trust authorities?

How are related security and privacy policies articulated, communicated to relevant stakeholders, and enforced?

Consistent with embodiments disclosed herein, appropriate technologies to enforce associated TPSS policies may be implemented to address one or more of the above considerations. For example, without limitation, DRM and policy management technologies such as those described in the '693 application, the '387 patent, and/or the '603 application could be used to express and enforce policies governing the operation of and interrelationships between devices in a personal IoT, and the collection and use of data therefrom.

Embodiments disclosed herein may further provide intuitive paradigms for establishing and administering system components and associated data exchanged in a connected device ecosystem such as a personal IoT. Administrative interfaces may be streamlined in a manner that facilitates relatively straightforward management by users. For example, in certain embodiments users may define policies, rules, and/or preferences regarding the manner in which data is collected, communicated, and/or otherwise used by their associated connected devices and/or other systems. Such policies, rules, and/or preferences may be articulated and implemented using any suitable mechanism, including, for example and without limitation, those mechanisms described in the '693 application and the '387 patent. Policies, rules, and/or preferences may define, among other things, how data may be collected by one or more connected devices, how it may be communicated from and/or between connected devices, and/or how it may be used by the connected devices and/or other third-party systems. Policies, rules, and/or preferences may further define certain security requirements of the connected device ecosystem and/or devices included therein.

Connected Device Ecosystem

FIG. 1 illustrates an exemplary connected device ecosystem consistent with embodiments of the present disclosure. In certain embodiments, the connected device ecosystem may comprise a personal IoT associated with a user. A variety of connected systems and/or devices 102-122 may be communicatively coupled via one or more networks 100 to form the personal IoT. The systems and/or devices 102-122 may be associated with a user, a group of users, a location, an entity and/or organization, one or more service providers (e.g., one or more third-party service providers and/or the like), and/or any combination thereof.

The systems and/or devices 102-122 may comprise any suitable computing system or systems configured to implement embodiments of the systems and methods disclosed herein. In certain embodiments, the systems and/or devices 102-122 may comprise at least one microprocessor-enabled system configured to execute instructions stored on an associated non-transitory computer-readable storage medium. As discussed in more detail below, in some embodiments some of the systems and/or devices 102-122 may comprise a secure processing unit ("SPU") configured to perform sensitive operations such as trusted credential and/or key management, secure policy management, and/or other aspects of the systems and methods disclosed herein. The systems and/or devices 102-122 may further comprise software and/or hardware configured to enable electronic communication of information between the devices and/or systems 102-122 via one or more associated network connections 100.

As illustrated in FIG. 1, systems and/or devices 102-122 in a personal IoT may include, without limitation, a smartphone or other wireless communications device 102, a desktop and/or laptop computer system 104, a wearable computing device (e.g., a smartwatch, an activity and/or fitness monitoring device, etc.) 106, a connected vehicle 108 and/or systems associated with the same (e.g., a passenger vehicle, aircraft, boat, train, and/or telematics and/or infotainment systems associated with the same, etc.), a home automation and/or security system and/or components associated with the same (e.g., security keypads, networked locks 110, gate and/or other access control devices, connected lighting, etc.), connected thermostats 112, HVAC systems, irrigation systems, water controls, pumps, heaters, home utility meters, home network gateways, activity sensors, alarms (e.g., fire and/or $CO_2$ alarms), a tablet computer, wireless control devices (e.g., keyless entry or remote start devices, etc.), gaming or other entertainment devices, connected home appliances (e.g., refrigerators 114, washing machines, ranges, toasters, etc.), consumer electronic devices (e.g., a bathroom scale, a digital camera 116, speaker systems, televisions, etc.), medical devices (e.g., pacemakers, insulin pumps, blood sugar monitors, etc.), and/or any other computing system and/or device as well as associated status and/or data stores.

The personal IoT may further include one or more service provider systems 118-122. In certain embodiments, the one or more service provider systems 118-122 may communicate, directly or indirectly, with a variety of the systems and/or devices 102-116 included in the personal IoT. In some embodiments, the one or more service provider systems 118-122 may provide information to and/or receive information from the systems and/or devices 102-116 (e.g., data collected by the systems and/or devices 102-116, control information for controlling the function and/or operation of the systems and/or devices 102-116, etc.). For example, a user may use a smartphone 102 to interface with a service provider system 118 associated with a home security company via network 100 to control the state of a networked lock 110 associated with his or her home security system. The user may further view information relating to a status and/or state of the networked lock 110 from the service provider system 118. As another example, service provider system 120 may comprise a personalized cloud storage system, such as described in the '603 application, that stores data received from devices 102-116 and facilitates the use and management thereof.

The systems and/or devices 102-122 may be communicatively coupled via one or more network connections 100. For example, as discussed above, a user may remotely communicate with a networked lock 110 and/or an associated service provider system 118 using a smartphone 102 via one or more network connections 100. In further embodiments, systems and/or devices 102-122 in the personal IoT may directly communicate without the use of any intermediate network connections 100 (e.g., via a proximal field communication channel and/or the like). For example, as illustrated, a user may communicate with a networked lock 110 directly using a smartphone 102 and/or communicate with a connected thermostat 112 directly using a laptop computer system 104.

The network connections 100 may comprise a variety of network communication devices and/or channels and may use any suitable communications protocols and/or technologies for facilitating communication between the connected devices and systems. In some embodiments, the network connections 100 may, for example, comprise the Internet, a local area network, a virtual private network, and/or any other communication network or combination of networks using one or more electronic communication technologies and/or standards (e.g., Ethernet or the like). The network connections 100 may use multiplexers, routers, hubs, gateways, firewalls, switches and/or any other network communication devices and/or systems to facilitate communications on the networks. In some embodiments, the network connections 100 may comprise a wireless carrier system such as a personal communications system ("PCS"). In further embodiments, the network connections 100 may comprise an analog mobile communications network and/or a digital mobile communications network using, for example, code division multiple access ("CDMA"), Global System for Mobile Communications or Groupe Special Mobile ("GSM"), frequency division multiple access ("FDMA"), and/or time divisional multiple access ("TDMA") technologies. In certain embodiments, the network connections 100 may incorporate one or more satellite communication links. In yet further embodiments, the network connections 100 may use IEEE's 902.11 standards, Bluetooth®, ultra-wide band ("UWB"), Zigbee®, near field communications (NFC) technologies, and or any other suitable technology or technologies.

It will be appreciated that a number of variations can be made to the architecture, relationships, and examples presented in connection with FIG. 1 within the scope of the inventive body of work. For example, certain device and/or system functionalities described above may be integrated into a single device and/or system and/or any suitable combination of devices and/or systems in any suitable configuration. Thus it will be appreciated that the architecture, relationships, and examples presented in connection with FIG. 1 are provided for purposes of illustration and explanation, and not limitation.

Risk Assessment for a Connected Device Ecosystem

Connected device and/or other IoT ecosystems may be associated with a variety of potential risks. For example, users, service providers, device manufacturers, and/or the like may face risks such as:

User loss of control of their private information collected by connected sensors and devices and shared with a variety of local and cloud-based services.

Malicious acts by intruders that may infiltrate connected device networks (e.g., disrupting scheduling of various controls such as lighting, irrigation, and thermostat controls).

Unauthorized use of household resources.

Unauthorized access to local and/or cloud-based services.

Introduction of viruses that cause damage or provide unauthorized access to and/or use of connected device ecosystem resources.

Malicious attacks on controls (e.g., shutting off and/or damaging lighting, heating, air conditioning, water, and/or other systems).

Intrusion (e.g., breaking and/or otherwise compromising security systems and/or networked locks).

Safety risks (e.g., resulting from access to device controls by unauthorized users. For example, children accessing temperature controls for faucets or remote control of swimming pool covers or gates).

Many of the above and/or other risks may result from certain decisions associated with the design and/or deployment of a connected device ecosystem such as a personal IoT, including, without limitation:

After-the-fact, non-systemically based application of security technology in response to early attacks.

The lack of intuitive connected device and/or personal IoT ecosystem management strategy and tools, resulting in ecosystems that are difficult for consumers to understand and administer, often leading to misapplication or non-application of connected device and/or personal IoT security and/or privacy mechanisms.

Failure to understand the trust, security, privacy and safety concerns within various layers involved in design and deployment of connected devices and/or personal IoT ecosystems.

Firmware and/or software practices that may not be oriented towards maintaining a trusted overall system.

Failure to take advantage of standards within and across all layers.

Systems and method are presented herein for addressing some or all of these risks. In addition, and consistent with certain embodiments disclosed herein, development of and adherence to standards can ensure that various elements of a personal IoT are interoperable and implement carefully designed primitives for security, privacy, communication, human interfaces, and/or any other suitable feature used in connection with building a trusted and robust network of devices.

Connected Device Ecosystem Layers

Figure 2:
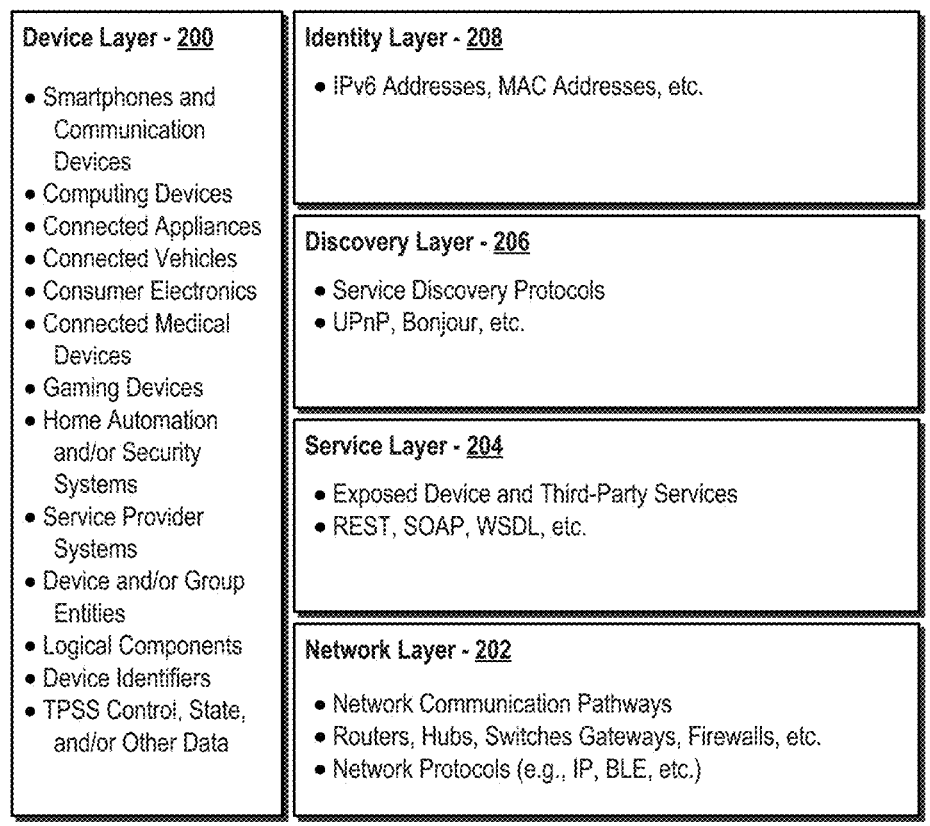
FIG. 2 illustrates exemplary architectural layers included in a connected device ecosystem consistent with embodiments of the present disclosure.

Various systems and/or devices illustrated in FIG. 1, and/or functionality associated with the same, may be associated with one or more conceptual architectural layers including, without limitation, a device layer, a network layer, a service layer, a discovery layer, and/or an identity layer. Mitigating potential risks associated with connected device and/or other IoT ecosystems consistent with embodiments disclosed herein may involve analyzing these constituent layers and applying appropriate TPSS strategies, principles, technologies, and methods. In certain embodiments, the various layers may be associated with certain defined and/or specified properties, and appropriate TPSS strategies, principles, technologies, and methods may be identified based on analyzing the interactions among the various layers. FIG. 2 illustrates various exemplary architectural layers 200-208 included in a connected device ecosystem consistent with certain embodiments disclosed herein. These conceptual architectural layers 200-208 are discussed in more detail below.

Device Layer

A variety of systems, devices, entities, and/or groups of entities may be associated with a device architectural layer 200. In certain embodiments, constituent entities and/or groups of entities (e.g., sensors, processors, controllers, boxes, etc.) associated with a particular system and/or device may further be associated with the device layer 200. In certain embodiments, identifying systems, devices, entities, and/or groups of entities included in the device layer 200 may involve determining whether systems, devices, entities, and/or groups of entities comprise a physical "thing" within an IoT ecosystem or a logical component of a larger component and/or "thing" and/or identifying what is a smallest indivisible component in the architecture.

In connection with implementing trust management systems and methods, the device layer 200 may be used to determine who and what are the logical and identifiable principals in the overall personal IoT ecosystem. In certain embodiments, the device layer 200 may comprise, among other things, information identifying associated systems, devices, entities, and/or groups of entities, and/or information related to associated TPSS-relevant controls, state, and/or other data.

Network Layer

The means by which various systems, devices, entities, and/or groups of entities and/or associated service providers (e.g., local and/or cloud-based service providers) in an IoT ecosystem communicate may be associated with a network architectural layer 202. In certain embodiments, TPSS methods consistent with embodiments disclosed herein may be implemented above the network layer 202. In further embodiments, TPSS methods consistent with the disclosed embodiments may be implemented through various network layers 202 and/or be compatible with a variety of network communication protocols. In some embodiments, implementing TPSS methods above the network layer 202 may, among other things, reduce dependence on certain administrative aspects of implementing network security.

Embodiments disclosed herein may be utilized in connection with a variety of network communication protocols including, for example, Internet Protocol ("IP") and/or Bluetooth Low Energy ("BLE"), although other network protocols are also contemplated. As an IP medium, WiFi is a common network technology that may be utilized in connection with the disclosed embodiments. Existing WiFi networks, however, may not implement particularly intuitive and/or secure mechanisms for managing network access. Accordingly, systems and methods disclosed herein may provide for more intuitive methods for users to manage various networks associated with a personal IoT. For example, certain embodiments may provide for more user-friendly mechanisms of provisioning devices with shared WiFi Protected Access ("WPA") keys.

Service Layer

The means by which various systems, devices, entities, and/or groups of entities and/or associated service providers expose services in an IoT ecosystem may be associated with a service architectural layer 204. The service layer 204 may comprise information relating to which device, entities, and/or groups of entities and/or associated service providers expose services as well as how such services are described, discovered, and/or invoked. A variety of scalable service architectures including, for example Representational State Transfer ("REST") services over HTTP, SOAP, WSDL, etc. may be utilized in connection with the disclosed embodiments, as may the service-oriented architectures and technologies described in the '387 patent. In some embodiments, administration of TPSS within a personal IoT ecosystem may be performed in connection with the service layer 204.

Discovery Layer

A discovery architectural layer 206 may describe how devices, entities, and/or groups of entities and/or associated services may be discovered on a network within the personal IoT ecosystem. A variety of protocols may be associated with the discovery layer 206 including, for example, Universal Plug and Play ("UPnP"), Bonjour, and/or the like. In some embodiments, service discovery protocols may be used that allow for implementation of improved security and/or access policies relative to conventional protocols, including, for example and without limitation, the service discovery techniques described in the '387 patent. In certain embodiments, systems and methods disclosed herein may provide for bootstrapping security when new devices, entities, and/or groups of entities and/or services are introduced to the personal IoT ecosystem.

Identity Layer

Within a personal IoT ecosystem, identification of various IoT ecosystem elements including, without limitation, systems, devices, entities, groups, users, and/or the like may be included in an identity architectural layer 208. Device and service identification may use a variety of technologies including, for example IPv6 addresses, MAC addresses, etc. Consistent with certain embodiments disclosed herein, principals, devices, and/or services of a personal IoT ecosystem may operate in a policy-managed environment. Associated policies may describe which entities—including individual persons or users—have access to which resources and/or under what conditions such access is permitted. Among other things, this may involve management of user identities on the network and/or reliably associating security attributes with user identities.

Consistent with embodiments disclosed herein, deploying a personal IoT implementing TPSS may entail understanding the above and/or other conceptual architectural layers 200-208, and the interaction that technological implementations and/or policy decisions have in each.

Explicit Private Networks

Certain embodiments of the systems and methods disclosed herein may use explicit private networks ("EPNs") to, among other things, intuitively describe and manage interactions among principals and layers in personal IoT and/or other connected device ecosystems. Among other features, EPNs may provide for TPSS for things and/or other devices by making control and data paths relatively explicit. For example, consistent with certain embodiments disclosed herein, an EPN may make security associations between people and things explicit and relatively easy to understand. Accordingly, if a person buys a thing and wishes to integrate the thing into his or her personal IoT, an EPN may facilitate some or all of the following:

Direct and secure control of the TPSS aspects of the thing.

Identification of who may control the thing, and/or aspects of it, at any time.

Directing data from the thing to secure stores that may manage the privacy of that data.

Grouping the thing together with other things for TPSS administrative purposes.

Embodiments disclosed herein may facilitate realization of some or all of the above, in a manner that is relatively intuitive and/or resistant to user error. As the size of an EPN grows, performance aids and services may be available to a user to help with scale, but the concepts of control and/or data flow will preferably remain relatively simple, and TPSS-related actions will preferably remain relatively intentional and reliable. In certain embodiments, TPSS data and controls in an EPN may be designed to respond to EPN messages over a network (e.g., when not controlled through direct physical interaction by a user).

In some embodiments, an EPN may be implemented in connection with a home network, where things in the network (e.g., a personal IoT) may comprise devices that may be automated and/or remotely controlled and/or that may have sensors and/or other associated functionality that may produce data that a user may wish to keep private. The home network may have access to the Internet, therefore motivating the use of an EPN (which itself may use the Internet) to maintain TPSS in the associated personal IoT. In such instances, the home network may not have an explicit defined network boundary, except as defined by the EPN.

Figure 3:
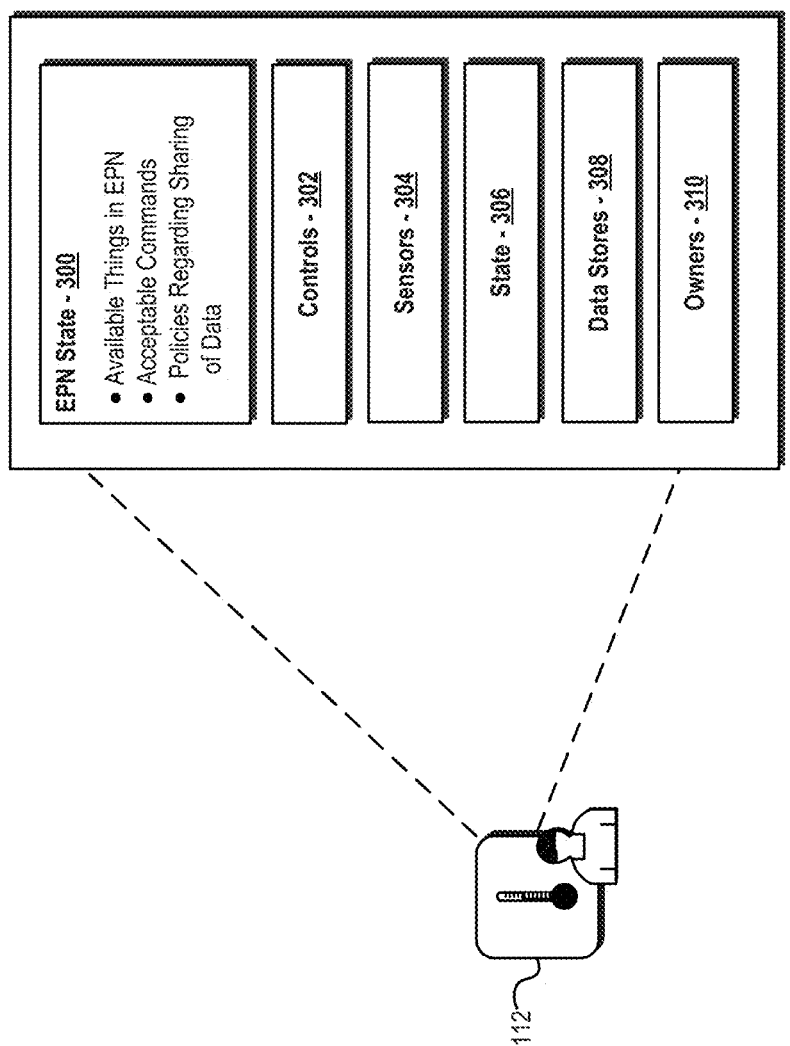
FIG. 3 illustrates exemplary attributes associated with a thing included in an explicit private network consistent with embodiments of the present disclosure.

In certain embodiments, an EPN may comprise a messaging network that operates above the IP layer of an associated network (e.g., a home network or the like). In certain embodiments, things included in an EPN may not have associated IP (and/or other) addresses from the perspective of the EPN. FIG. 3 illustrates various exemplary EPN attributes 300-310 associated with a thing (e.g., a connected thermostat 112) included in an EPN consistent with and illustrative embodiment of the present disclosure. As shown in FIG. 3, things that are part of an EPN may be associated with an EPN state 300. In certain embodiments, the EPN state 300 may comprise information relating to other things that the subject thing (e.g., the connected thermostat 112) may interact with through the EPN, information regarding what commands are acceptable from the other things, information regarding what data can be sent to other available things, and/or the like. In some embodiments, the EPN state 300 may comprise a table and/or a list of such information.

As illustrated, attributes associated with a thing 112 may, for example, include controls 302, sensors 304, states 306, data stores 308, and/or owners 310. Controls 302 associated with a thing 112 may cause the thing 112 to change an associated state 306 (e.g., and therefore do something). A thing 112 with controls 302 that control other things may be called a controller. A controller may be a distinguished thing within the EPN that may send messages to other things that are intended to change the other things' state and/or to generate and/or otherwise provide data via other EPN messages. A thing 112 may be associated with one or more data stores 308 for maintaining data generated by the thing 112. In certain embodiments, such a data store 308 may comprise one or more other things.

A thing 112 may be associated with one or more owners 310 that may initiate the EPN state 300 and/or that may have other privileges with respect to things 112 in their direct control. In certain embodiments, an owner 310 may use a controller to initiate an EPN state 300 for a thing 112. In such a circumstance, the controller may be the initial thing on the subject things' EPN state list. In certain embodiments, a controller thing (e.g., a smartphone executing an associated application) may comprise a user interface that restricts access to the controller thing to one or more authorized users. Such authenticated restricted access to the controller may help ensure only authorized users are able to initiate an EPN state 300 for a thing 112. In further embodiments, a controller may be delegated with certain privileges associated with an owner. In yet further embodiments, an IoT ecosystem implementing an EPN may arrange (e.g., automatically arrange) for a secure EPN network backup for resetting and/or reinitializing things in an EPN.

Once a thing in an EPN is initialized, it may obtain other controllers authorized by the owner 310 and/or by others delegated by the owner 310. For example, a thing 112 may add owners using the same or a similar protocol that was used to establish the initial owner 310. In other circumstances, an owner 310 may delegate certain activities to another controller but limit the capabilities of such a delegated controller (e.g., restrict the ability to add additional controllers with owner privileges or the like).

Consistent with embodiments disclosed herein, an EPN may be mapped onto the various IoT layers described herein to, among other things, provide support for an intuitive personal IoT management framework supporting TPSS.

A variety of strategies, principles, and/or methods consistent with embodiments disclosed herein may be utilized in connection with a personal IoT EPN that provides TPSS. In certain embodiments, various virtual private network ("VPN") protocols and/or firewall mechanisms may be utilized in connection with establishing an EPN. In further embodiments, selecting appropriate security and privacy technologies for use in connection with establishing an EPN may involve, without limitation, some or all of the following:

Decomposition of a personal IoT into conceptual layers.

Application of trust management principles to map which principals in the IoT have access to which resources, under what conditions, and for what purposes.

Application of the EPN model to a personal IoT, facilitating intuitive articulation and management of control and data paths. This may include, among other things: creation of relatively simple and intuitive protocols for security association (e.g., matching controllers to controls) and delegation (e.g., allowing other people and entities to control devices that a user can control, to access data for a user's devices, etc.); tighter control over data and/or control paths, restricted to local control in certain circumstances, and using proof of presence when appropriate and/or convenient; limitation of mobile code interaction with TPSS attributes and establishment of separate control authorization paths from software update paths; assistance from trusted personal agents and/or trusted services that may assist users in assessing and visualizing the consequences of granting access to specific controls and/or data; use of standardization so that users may more readily and consistently recognize controls and their relationship to specific devices (e.g., via use of standard indicators and/or identifiers); and/or establishing consumer controlled trusted intermediary services for collection, maintenance, and/or dissemination of data.

Accommodation of relatively tight controls to reduce the likelihood of inconvenient and/or otherwise damaging breaches.

EPN Implementation Principles

A variety of principles may be taken into account when configuring and/or otherwise implementing an EPN for use in connection with a personal IoT, including, without limitation, some or all of the following:

Relatively simple association and/or configuration between owners and things (e.g., via direct communication between owners and various things). For example, Near Field Communication ("NFC"), radio-frequency identification ("RFID") communication, Bluetooth®-enabled ("BLE") communication, and/or the like may be used to safely establish certain EPN membership and/or configuration information. In certain embodiments, such information may comprise shared secret information indicating membership in the EPN and/or an associated group. For example, a user may bring a new NFC-enabled thing into proximity with an NFC-enabled smart phone and the new thing may be provisioned with membership and/or configuration information for the EPN, thereby initiating its membership in the EPN.

Relatively high impact reprogramming and/or reconfiguration of the EPN (e.g., in the event of a change of ownership of a thing), and/or aggregation of EPN controls. In certain embodiments, such methods may use proof of presence techniques in connection with associated controllers and/or things prior to allowing reprogramming and/or reconfiguration.

Processes for delegation of control may use performance aids (e.g., aids with appropriate alternative accessibility modes) that display and/or otherwise highlight downstream consequences of altered delegation chains.

Protocols may recognize device classifications (e.g., classifications of safety hazards and/or levels) and/or scope (e.g., is the device itself a controller of other devices) so that as EPN control and/or data flow topology evolve, consequences of such changes may be highlighted and/or identified.

Provide feedback regarding the consequences of changes to centralized and/or otherwise aggregated controls. For example, a user may be notified of potential security risks associated with a specific action, as well as potential ramifications of such an action (e.g., "If you delegate this controller to this device, you may be trusting your 3-year old child to control bath water temperature and to open the pool cover.")

Provide lockouts and overrides that are relatively easy to understand and/or control.

Various protocols may be configured to be reset, updated, and/or restored.

Provide mechanisms (such as sandboxing or process and data segregation) to limit the access of things controlled by external entities. For example, in exchange for a lower electricity rate, a consumer may delegate control of certain appliances to a utility operator (e.g., an air conditioning unit). Such an arrangement may be potentially exploitable and, consistent with embodiments disclosed herein, such devices can thus be segregated from other devices and services in the personal IoT. For example, data from such a device may be available to other things in the personal IoT, but such an externally controlled thing may have only limited (or no) access to data from, or control over, other things.

Establishment of standard user interface controls including, for example, symbols, control representations, labels, and/or the like, thereby facilitating ease of use and/or interaction by users of the EPN.

Interaction with a Personal IoT

An example of an interaction between a user and an illustrative personal IoT implementing certain embodiments of the systems and methods disclosed herein is described below. In this example, a user may be interested in using a smartphone-based Internet application through which he or she may control and view data from various things to which he or she has access. The user may use such an application to, among other things, administer TPSS attributes and/or other configuration settings for their associated things, as well as to control and/or organize data communicated to/from and/or otherwise collected by such things. The user may, among other things, use the application to add new things to his or her personal IoT, to group things into single administrative entities (e.g., virtual things), to give others access to controls and/or data associated with the things, to reset, reconfigure, and/or cede ownership to others, and/or the like.

The user may obtain a new thing and wish to add it to his or her personal IoT and/or other associated EPN. There are a variety of circumstances relating to the state of the new thing that may inform how the user may add it to the user's personal IoT. For example, the thing may be in a "no-owner" state (e.g., as may be the case in connection with a new thing), and the user may wish to claim it as its owner. As another example, the thing may be owned by someone else who may allow anyone with physical access to the thing to control it and receive data from it remotely (e.g., as may be the case in connection with a public webcam). As yet another example, the thing may be owned by another who has already explicitly authorized the user to use the thing. In other circumstances, the user may need to request and receive authorization for access to the thing from its owner.

Figure 4:
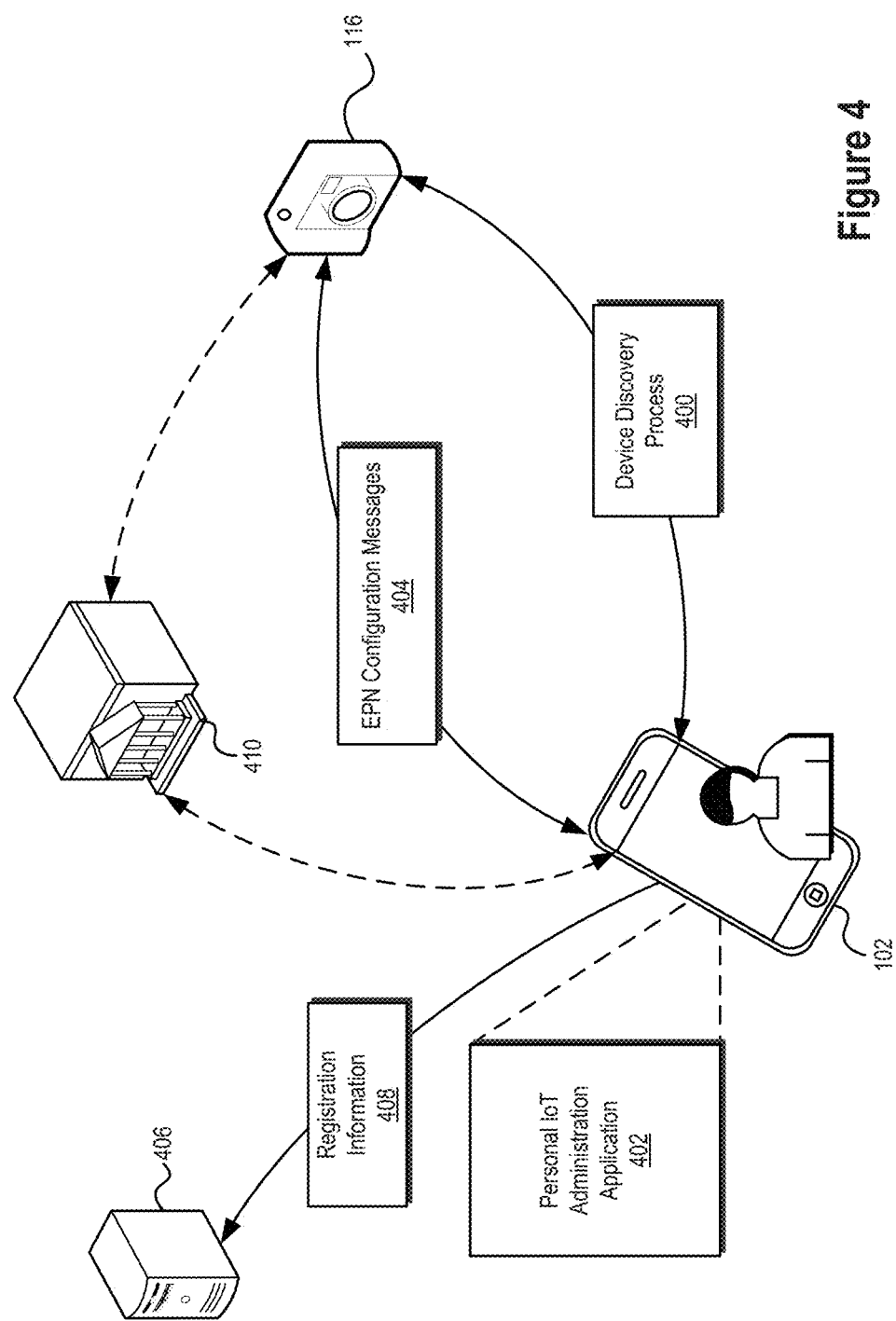
FIG. 4 illustrates a membership initiation process in an explicit private network consistent with embodiments of the present disclosure.

Under the first circumstance described above, the user may engage in a membership initiation process to add the thing to the user's personal IoT. FIG. 4 illustrates a membership initiation process in an EPN associated with a personal IoT consistent with certain embodiments of the present disclosure. As shown, the user may bring the thing 116 (e.g., a connected digital camera or the like) in proximity to a smartphone 102. The smartphone 102 and/or the thing 116 may engage in a discovery process 400 to establish direct and/or indirect communication with the thing 116. For example, in some embodiments the smartphone 102 may use a wireless communication channel (e.g., such as NFC, IEEE's 902.11 standards, Bluetooth®, UWB, Zigbee®, and/or any other suitable communication channel) to exchange one or more messages as part of the discovery process 400.

In some embodiments, such a discovery process 400 may be automatic when the smartphone 102 and the thing 116 are brought into proximity of each other. In other embodiments, the discovery process 400 may be initiated by the user using an application 402 executing on the smartphone 102 (e.g., a personal IoT administration application and/or the like). In further embodiments, the application 402 may be a web or cloud-based application (e.g., an application accessed via a browser of the smartphone 102).

In the example shown in FIG. 4, the thing 116 may communicate information relating to the thing 116 to the smartphone 102. For example, the thing 116 may communicate a URL to the smartphone 102 providing information regarding the thing 116 (e.g., information regarding various attributes associated with the thing, such as EPN state, data stores, devices, sensors, controls, etc.). Via the application 402, the user may be presented with options to establish ownership and/or control of the thing 116. After selecting the option to establish ownership and/or control of the thing 116, a security association protocol ("SAP") may be invoked between the application 402 and an EPN configuration service provided by the thing 116. Among other functions, SAP methods may be used in connection with associating an authorized controller to a controlled item.

A sequence of messages 404 may be exchanged between the smartphone 102 and/or thing 116 providing, for example, identification information relating to the thing 116 (e.g., the thing's Universally Unique Identifier ("UUID") and/or any other identification information such as an IP-based ID established using the SAP protocol), the controller's (e.g., the smartphone 102 and/or the associated applications 402) identification information (e.g., UUID or the like).

The messages 404 may further include certain EPN configuration information allowing the thing 116 to become a member of an EPN associated with the user's personal IoT. For example, a symmetric key pair may be established between the smartphone 102 and the thing 116 allowing the application 402 to securely send and/or receive messages from the thing 116 over a variety of communication channels (e.g., direct or otherwise). In further embodiments, a broadcast key may be provided to the application 402 allowing the application 402 and/or the smartphone 102 to decrypt broadcast data received from the thing 116.

An EPN state associated with the thing 116 may be updated to reflect the user as the thing's first owner, and the application 402 may communicate with a service provider 406 associated with the thing 116 (e.g., a manufacturer or the like) to register the new thing 116 (e.g., by exchanging registration information 408 and/or the like). In certain embodiments, the application 402 may enable the user to add the thing 116 to one or more groups and facilitate other things in the associated EPN to discover the thing 116 (e.g., by "pushing" configuration information associated with the thing 116 to other things in the EPN, by making such information available to other things via shared cloud or network storage, and/or the like). The user may further use the application 402 to delegate access to other EPN controllers used by, e.g., other family members. In certain embodiments, the application 402 and/or the thing 116 may communicate with a system associated with a trusted service 410 to monitor various information generated and/or communicated to and/from the various things in the user's personal IoT. In some embodiments, the application 402 and/or thing 116 may communicate with a personalized cloud storage and management system such as that described in the '603 application.

In certain embodiments, the above described initiation process may be automated at least in part and may involve relatively little interaction and/or direction from the user. In further embodiments, the process may vary based on various attributes of the thing 116 being added to the personal IoT and/or associated EPN.

Authorizing Access to a Connected Device

In circumstances where a thing may be owned by another who has already explicitly authorized a user to use the thing and/or the user needs to request and receive authorization for access to the thing from its owner, a Security Association Management Protocol ("SAMP") may be used in connection with initiating the thing into the user's personal IoT. For example, a SAMP may use EPN messages to enable authorized owners of things to delegate and/or revoke authority to other EPN controllers by updating a thing's EPN state with new security associations. For example, an application (e.g., a web-based application) that uses a database of things, including controllers and/or their association with certain users, may be used in connection with updating a thing's EPN state with new security associations. In some embodiments, the application may originate messages that may allow assignment of authority over controls and/or data associated with the thing to others (e.g., friends, family, and/or the like). In some embodiments, such messages may further comprise appropriate reminders regarding safety and security implications of such actions. A SAMP may be used to send such messages to things and/or associated controllers (e.g., delegated controls). In further embodiments, a SAMP may be used when groups of things are created so that a group controller may act with authority.

Other messages may be utilized in connection with a SAP and/or a SAMP consistent with embodiments disclosed herein. In some embodiments, direct 1-1 communications may be utilized to allow for bootstrapping trust. In certain embodiments, this may allow use of simpler and/or more economical symmetric key based cryptographic methods with less public key infrastructure overhead. In other embodiments, direct communications between things may not be used (e.g., as may be the case on local WiFi networks that implement discovery protocols).

In some embodiments, certain EPN settings within a personal IoT may be reset by a user. In certain embodiments, remote resets may be utilized. In further embodiments, states associated with a thing may be reset independent of EPN state.

Gateways

Gateways included in an EPN may provide several functional roles including, without limitation, some or all of the following:

Bridging lower-level networks (e.g., WiFi, Bluetooth®, BLE, Zigbee®, etc.) with one another and IP networks.

Forwarding EPN messages.

Hosting virtual things such as, for example, functional groups of things.

As EPNs may operate at the messaging layer, a gateway that implements network bridging and message forwarding may not necessarily need to be secure. In other embodiments, such as may be the case when the gateway is an EPN member or hosts EPN members (e.g., large groups of things or the like), a gateway may manage secret information and/or include secure storage, isolating these virtual things from other gateway functions.

Services

Things in a personal IoT may implement services for EPN administration that may carry out SAP and SAMP methods. Other services may also be used in connection with an EPN, including services that implement, without limitation, some or all of the following:

Aid in the grouping of things into virtual entities and ad hoc orchestration of capabilities that involve many things.

External monitoring and/or control such as, for example, utility provider systems that may monitor power and/or can control home devices.

Data aggregation and visualization.

Backup services for EPN member device configurations including EPN state.

EPN analysis that looks for security and/or safety faults.

Secure services may be hosted external to a home LAN, but may also function as part of a household EPN. Such services can further host EPN members that have delegated authorities.

Human Machine Interaction Model

While embodiments of the systems and methods described herein may be designed to allow users to better use, interact with, and/or benefit from a variety of tangible connected things, they may also involve intangible objects and mechanisms that may be handled by computers and communication devices. Some of the human interactions may correspond to familiar actions with tangible objects such as locking doors and windows or operating the controls on an appliance; however, many other interactions described herein may involve actions such as granting to other people or other things the ability to operate those controls.

Systems and methods disclosed herein further provide for performance aids whereby users may be able to better understand the TPSS consequences of various actions and be relieved of understanding the various implementation technologies, operating systems, and communication protocols. In some embodiments, such performance aids may also allow people to view a group of things as a logical whole entity, where commands can be given to the entity as a whole, and data and/or state feedback is also collected from that entity. The performance aids may help a user to visualize the consequence of such interactions, and provide notifications and advice concerning TPSS issues from such interactions.

Figure 5:
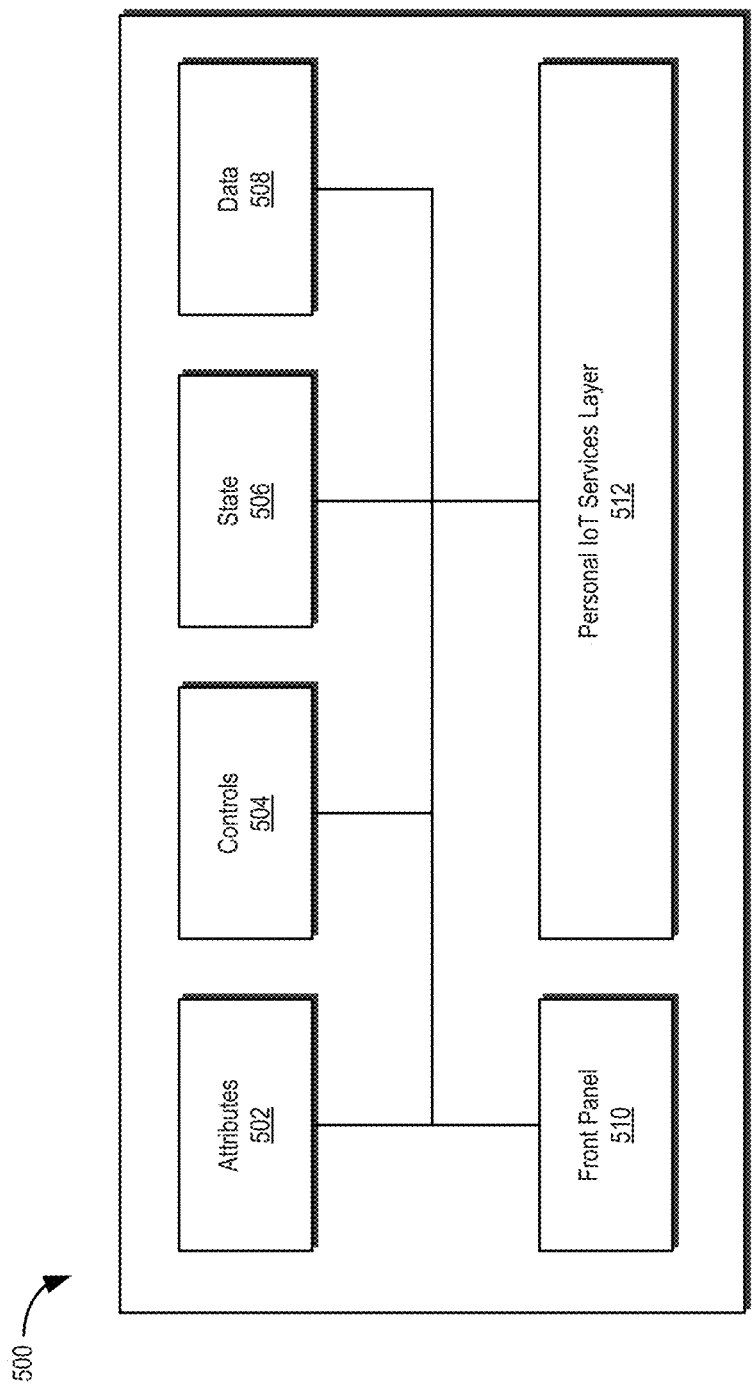
FIG. 5 illustrates elements of a connected device consistent with embodiments of the present disclosure.

FIG. 5 illustrates certain exemplary elements 502-512 of a connected device or thing 500 (e.g., a connected thing) consistent with embodiments disclosed herein. The various elements 502-512 may be implemented in a variety of ways, including using software, firmware, hardware, and/or any combination thereof.

The thing 500 may comprise one or more thing attributes 502 that may define the thing according to a taxonomy (e.g., an industry-accepted taxonomy). In certain embodiments, the attributes 502 may comprise one or more attribute values that may be standardized and/or manufacturer specific. For example, the attributes 502 may comprise one or more standard descriptions of hazards that may help inform various command and/or control decisions involving the thing 500. As another example, the attributes 502 may comprise explicit, appropriate user age requirements. It will be appreciated that a variety of other types of attributes or values may be articulated, and that any type of attribute 502 may be utilized in connection with the disclosed embodiments.

One or more controls 504 associated with the thing 500 may be actuated through a physical front panel 510 (e.g., a human-machine interface and/or the like) and/or through remote commands provided through a personal IoT services layer 512, described in more detail below. The front panel 510 may, for example, comprise a variety of interfaces, including, without limitation, a touchscreen, a keyboard, a mouse, a track pad, buttons, switches, outputs, and/or the like.

The thing 500 may further comprise one or more state variables 506 that may characterize various conditions of internal aspects of the thing 500. In some embodiments, the one or more state variables 506 may comprise state information associated with a state machine included in the thing 500. In certain embodiments, the state variables 506 may comprise current sensor measurement data associated with the thing.

The thing 500 may further comprise one or more data variables 508 that may correspond to measurements from sensors and/or other elements associated with the thing 500. For example, data variables 508 may comprise historical sensor data and/or state logs. In certain embodiments, state variables 506 and/or data variables 508 may be similar but distinguishable based on information included therein originating from different information flow paths.

Figure 6:
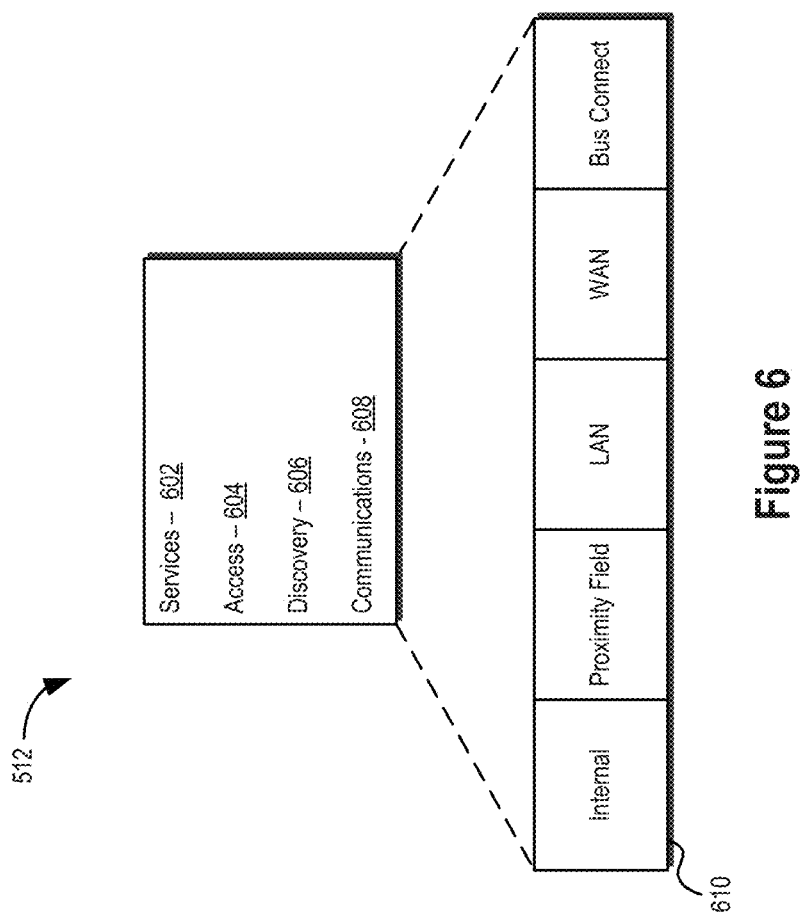
FIG. 6 illustrates an exemplary service layer of a connected device consistent with embodiments of the present disclosure.

FIG. 6 illustrates an example service layer 512 of a connected device. In certain embodiments, the service layer 512 may facilitate connection of the associated thing to a personal IoT, access to services provided by other things, and access by other things to services offered by the associated thing. As illustrated, the service layer 512 may comprise various sublayers including, without limitation, a services layer 602, an access layer 604, a discovery layer 606, and/or a communications layer 608.

Services associated with the communications layer 608 may comprise ways that commands and/or requests may be input to, and their responses output from, the thing. In some embodiments, the communications layer 608 may translate various signals into messages that may be processed by higher layers. For example, the communications layer 608 may comprise physical signal and/or network protocols associated with the thing.

The discovery layer 606 may comprise various protocols through which other things and/or connected entities can discover the various services provided by the thing. The access layer 604 may comprise various methods that may be used and/or otherwise invoked to allow access to various controls and/or data associated with the thing, e.g., depending on attributes of a requestor (e.g., whether the requestor is authorized for such access). The access layer 604 may further contain information relating to a device state and/or a network entry point associated with the thing. The services layer 602 may comprise various services and/or methods associated with capabilities of the associated thing that are available to other things and/or entities under a variety of different conditions, as may be determined by the other layers 604-608. Services offered by the services layer 602 may include, for example, various control services (e.g., remote front panel control services), initialization services, data access services, monitoring and/or notification services, data delivery services, system update services, access update services, service update services, and/or any other suitable services.

In certain embodiments, an initialization service may include methods allowing for the secure establishment of a first remote controller and/or the establishment of a peer list that may allow an associated thing to directly or indirectly interact with other things in the personal IoT. The initialization service may further expose the device to other services that may place the thing in a more useful context (e.g., by making the thing available as part of a composition of things and/or providing a shadow of control, state, and/or data for the thing in an associated cloud).

Access update services may allow delegation of control to new controllers by an initial remote controller of a thing and/or subsequent controllers. For example, an access update service may allow a first remote control having an established control link with a thing to allow other controllers and/or associated users to control the thing using their controllers. Permissions for someone who has access to one or more services may also be updated using access update services.

System update services may facilitate software updates for various capabilities of a thing. In certain embodiments, this may allow for improved integration of TPSS methodologies in a personal IoT. Data delivery systems may provide services for other entities and/or things to request and subsequently receive various data collected by a thing. Monitoring and/or notification services may allow other entities to continuously or periodically monitor a thing and/or receive push notifications of alarms and/or status changes. Control services such as remote front panel control services may allow other entities to remotely control the function of a thing and/or receive messages that might appear on an interface of the thing. Advanced control services may further provide distinguished remote control services that may require restricted access. For example, such services could allow for control of sensitive functions (e.g., temperature or sound pressure limiters, etc.), and/or change the functions that are actuated by physical front panel controls of a connected thing.

Consistent with some embodiments disclosed herein, TPSS protective capabilities implemented in connection with a thing may be designed so that they can be implemented independently (or relatively independently) of most operating system and/or communications capabilities. That is, TPSS protective capabilities may be implemented so that they may be provided at least relatively independently. For example, in some embodiments, things can be provisioned with a control module implementing TPSS capabilities that is isolated from access by the operating system or other system resources. For example, the control module may use its own task management services that use only primitive services (e.g., memory, I/O, CPU cycles, etc.) from the host operating system.

A thing may have a variety of physical and/or logical communications capabilities 610. As illustrated, communication capabilities 610 of a thing may, for example without limitation, include some or all of:

Internal Communications—Communications where signals originate on a processor bus local to the thing.

Proximal Field Communications—Communications where a thing that provides commands and/or requests is located in close proximity (e.g., via NFC, BLE, and/or other similar wireless connections). In some embodiments, proximal field communications may be implemented using longer range communication technologies that implement a suitable proximity detection protocol.

Local Area Network ("LAN") Communications—Communications on a local area network. In some embodiments, such communications may comprise logically distinguished communications between devices accessible through a local router and not originating through a WAN port on the router and/or having the same Class C address.

Wide Area Network ("WAN") Communications—Communications received from a wider area network such as the internet.

Physical Bus Communications—Communications from a physical bus included in the thing (e.g., Universal Serial Bus ("USB") communications, Secure Digital ("SD") communications, etc.)

In certain embodiments, service discovery in a personal IoT may depend, at least in part, on device state and/or network access type. For example, a set of services may be exposed or not depending on whether an associated thing has been initialized. In some embodiments, certain services (e.g., pushing an update, establishing an initial administrator, etc.) may be available to other things and/or entities depending on whether the thing and/or entity is communicating using proximal field communication.

Figure 7:
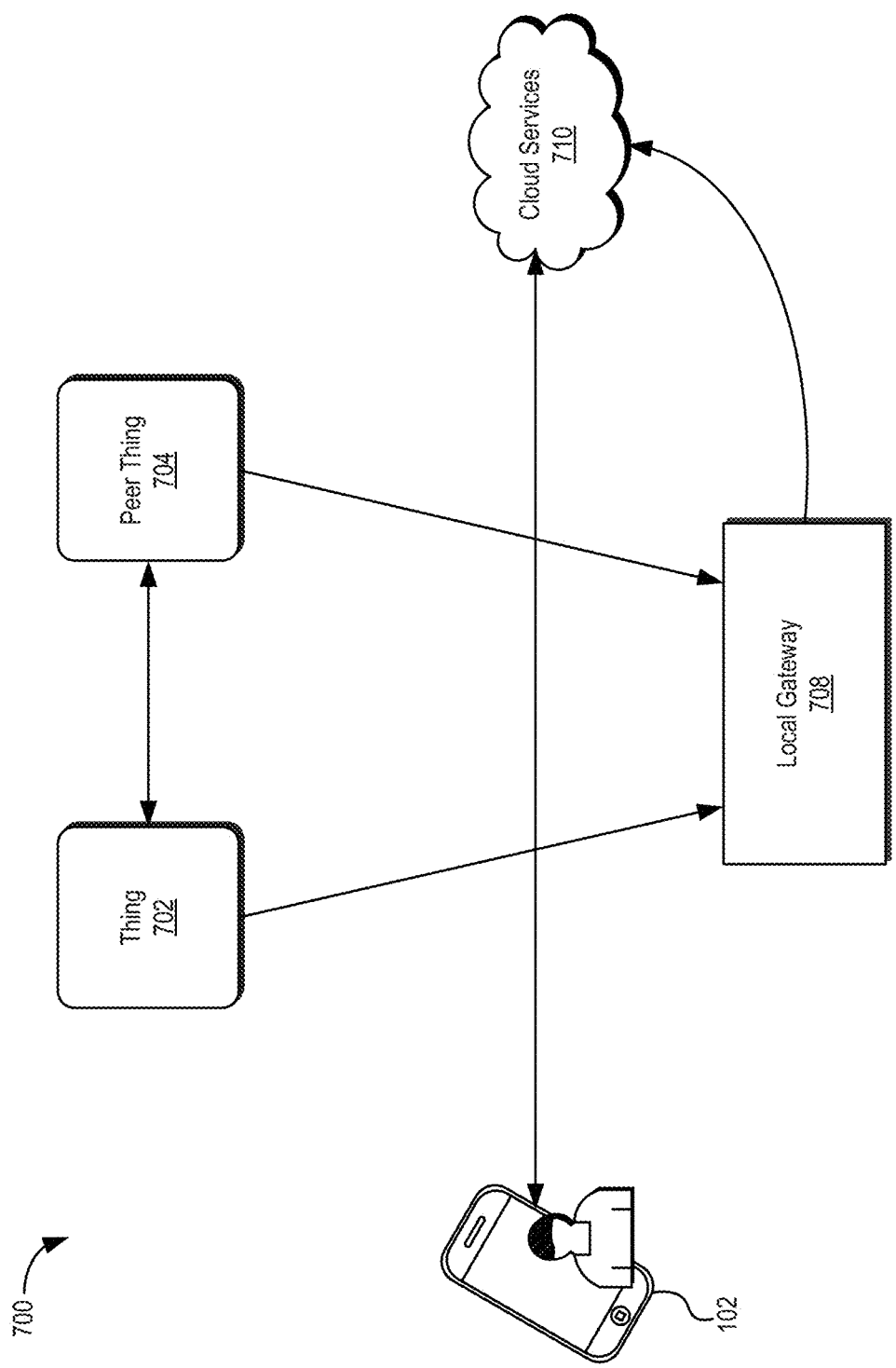
FIG. 7 illustrates an exemplary connected device interaction model consistent with embodiments of the present disclosure.

FIG. 7 illustrates a connected thing interaction model showing exemplary interaction among components 702-710 included in a personal IoT 700 consistent with embodiments disclosed herein. As illustrated, a first connected thing 702 may interact with a peer thing 704. In certain embodiments, the interaction between the thing 702 and the peer thing 704 may be less constrained than certain other interactions in the personal IoT 700. In some embodiments, less constrained communications may be facilitated by the ability to distinguish communicated items based on network type and/or associated thing attributes. For example, service discovery (at least for some services) and/or command and request access may be less constrained.

The thing 702 may interact with a personal portable computing device such as a smartphone 102, although other types of personal portable computing devices may also be used including, without limitation, hand-held remote controls, tablet computers, and/or any other type of computing device described herein. In some embodiments, the thing 702 may begin in an uninitialized state whereby limited associated services are available from the device (e.g., initialization services). In certain embodiments, the smartphone 102 may comprise proximal field network interfaces (e.g., NFC and/or BLE interfaces) that facilitate initialization of the thing 702. After initialization of thing 702, the smartphone 102 may be utilized in connection with introducing the thing 702 to other things (e.g., peer thing 704) and/or services.

A local gateway 708 may provide routing and protocol conversion services within the personal IoT 700, including, for example, network protocol conversion. The local gateway 708 may further provide LAN/WAN address conversion. In certain embodiments, the local gateway 708 may be logically linked and/or authenticated via an access layer of the various things 702, 704 in the personal IoT 700.

Cloud services 710 may include one or more trusted services available to the personal IoT 700 allowing various associated things 702, 704 to interact directly or indirectly through personal portable computing devices, other things, and/or gateways. Such trusted services may, for example and without limitation, include some or all of the following:

Device Shadow Presentations—Services where a functioning visual model of a thing is made available to other things in the personal IoT 700, and the thing is controlled through the model. In certain embodiments, such services may also be made available directly through various things and/or personal portable computing devices such as a smartphone 102.

Data Collection Services—Services facilitating collection of data from various things.

Data Integration Services—Services where data from many things may be aggregated and/or inferences may be made from the aggregated data.

Data Visualization Services—Services where data may be analyzed and/or inferences from such data may be made to generate graphical representations of the data.

Access Configuration Services—Services for configuration of data access and/or services for other things in the personal IoT 700 and/or for entities outside the personal IoT 700. For example, activity data provided to certain public utilities and/or alarms provided to personal relatives outside the personal IoT 700.

Compositions of Services—Composition services where multiple things (e.g., things 702, 704) may be grouped together to form composite things with interconnected controls. For example, garden moisture sensors may be integrated into sprinkler systems, attic and/or ceiling fans can be integrated with window controls to create integrated airflow systems, and/or the like.

TPSS Performance Aid Services—Services providing TPSS performance aids may provide, among other things, access control graphs that may illustrate the effect of different control delegation and composition actions. For example, a performance aid service may warn a user that giving a child access to a composite thing could have potentially unsafe consequences.

Update Services—Services for updating a thing may be provided from the cloud in a trusted fashion, with actual updates provided through trusted paths determined by the cloud. In certain embodiments, update services may be TPSS sensitive to mitigate the potential for introduction of worms and/or malware provided through nefarious updates. Consistent with embodiments disclosed herein, a personal IoT 700 may enable a number of safe update procedures that may be tailored to various risk levels. Various update procedures may be recommended for specific personal IoT 700 configurations using TPSS performance aids as described above.

Backup and Restoration Services—Services allowing for backup and/or restoration of various personal IoT 700 configurations.

Access System Mechanisms

An access layer included in things within a personal IoT may perform a variety of functions. In some embodiments, the access layer may function as a message passing system whereby command and/or request messages from external entities may, for example, be decrypted (in embodiments where encryption is used) and/or checked for source authenticity and/or permissions. In certain embodiments, such functionality may be facilitated by pairing each entity that is registered with the thing (e.g., other things). In some embodiments, this pairing may include establishing a shared key and determining appropriate permissions with the paired things and/or entities. The pairing may be described as a security association, and may be established and/or maintained using a SAMP consistent with embodiments disclosed herein. In certain embodiments, a SAMP may comprise messages that may establish pairings over trusted channels and/or through secure introductions from trusted sources.

As the access layer may examine remote commands, actuated controls and/or requests for data associated with things, the integrity of the TPSS implementation may depend, at least in part, on message protocol correctness, how tightly the access system is bound to controls and/or data, and/or how well the overall user interaction model supports safe and secure operation by the user. In certain embodiments, personal IoT SAMPs may be designed to enable and/or expose explicit relationships among entities that may control and/or receive data from an associated thing.

Key Management

Cryptographic keys may be established, managed, and/or used in connection with embodiments of the disclosed systems and methods in a variety of ways. Internet-enabled devices often need credentials required by Certification Authorities or associated communications, and may use communication protocols that involve complex configuration procedures for certain communication scenarios. Consistent with certain embodiments disclosed herein, in connection with a personal IoT, such credentials and/or communication protocols may be used less frequently (e.g., as may be the case with service interactions with entities that are already provisioned with such credentials and/or have well-provisioned and/or carefully deployed and maintained security protocol implementations) if at all. Embodiments disclosed herein may further streamline and provide a more intuitive approach towards implementing TPSS connected devices, and/or may reduce the burden of provisioning and maintaining cryptographic keys and/or certificates by device manufacturers.

In some embodiments, various things may communicate securely with one another by forming a security association. In some embodiments, each thing in the personal IoT may maintain an access table with entries for each other thing the thing may interact with, along with other entities included in the personal IoT (e.g., other devices, systems, cloud services, gateways, etc.).

Figure 8:
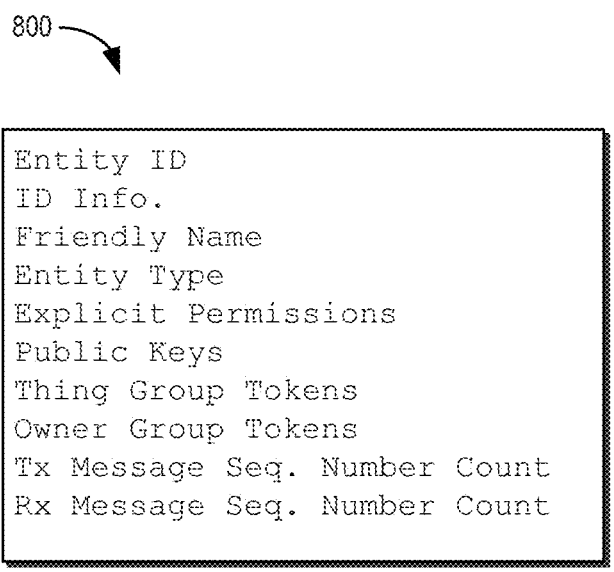
FIG. 8 illustrates an exemplary security association record associated with a thing consistent with embodiments of the present disclosure.

FIG. 8 illustrates an exemplary security association record 800 associated with a thing consistent with certain embodiments disclosed herein. As illustrated, the security association record 800 may, for example, comprise some or all of: an entity ID, identification information, a friendly name, an entity type, explicit permissions, public keys, thing group and owner tokens, and/or counts of transmitted and received message sequences, and/or any other suitable type of information. These various examples of types of information that may be included in a security association record 800 are described below:

Entity ID—An entity ID included in the security association record 800 may be a hash of a first public key provided by an entity when the secure association is established.

Identity Information—Identity information may include information provided in a delegation protocol that introduced the associated entity such as, for example, age of a controlling device user, relationship (e.g., family, neighbor, authorized commercial entity, etc.), and/or the like. In further embodiments, the identity information may include identity information provided by a manufacturer and/or supplier of the thing.

Friendly Name—A name (e.g., "Nancy's phone", "Office window", and/or the like) that may be given to an entity by a thing owner (e.g., using a cloud service, an application, and/or the like).

Entity Type—An attribute that may distinguish between things that are principally controllers and/or associated with a user (e.g., a smartphone or similar device) from more passive things that may not control other things (e.g., window and/or door locks, lights, etc.). An entity type may be associated with a thing, an owner, a peer, a delegated user device and/or controller, a cloud service entity, and/or any other entity type. In some embodiments, the entity type may determine certain implicit permissions associated with the thing. In certain embodiments, explicit permissions including, for example, permissions specifically articulated and/or otherwise configured by a user, may override certain implicit permissions. Exemplary entity types may include, without limitation, manufacturer, owner, peer, local control delegate, cloud control delegate, and/or cloud owner proxy.

Public Keys—Public key(s) associated with a thing may be used to form a symmetric cryptographic key to authenticate and/or encrypt/decrypt messages. In certain embodiments, these "public keys" are not meant to be public in the normal sense of the word, but rather simply comprise non-secret keys in an asymmetric cryptosystem where there are secret keys and non-secret counterparts (e.g., public keys).

Thing Group Tokens—A sequence of authentication tokens (e.g., shared random numbers) that may indicate memberships in different groups that the thing and an associated entity and/or thing are members of Thing group tokens may be used in certain pairing and/or delegation protocols, and may function as Anti-Spoof Variables ("ASVs").

Owner Group Tokens—An owner group token may be used to introduce a thing to other things owned by the same registered owner.

Tx Message Sequence Number Count—A count for a current message sequence number in a transmit direction.

Rx Message Sequence Number Count—A count for a current message sequence number in a receive direction.

Entities may be provisioned with one or more public key/private key pairs that may be part of a common cryptographic system. For example, a public key may be derived from a prime field by exponentiation $X\hat{0}r$ mod p for p a large prime and r the private key (e.g., a large random number). In other embodiments, a public key may be derived from an elliptic curve with a common set of domain parameters. In other embodiments, other techniques can alternatively, or in addition, be used.

In certain example embodiments, a shared cryptographic key between two entities in the system may be established as described in U.S. Pat. No. 5,450,493 ("the '493 patent", the contents of which are hereby incorporated by reference), whereby a derived key for a Diffie-Hellman ("DH") key exchange is established by hashing a vector derived from the exchange with another vector that may be established and/or generated separately (which may be referred to as an anti-spoof variable (ASV)). In some embodiments of the personal IoT, an ASV may be null in certain situations (e.g., when two entities are establishing a key as part of a pairing protocol over a proximal field communication channel such as NFC). In other cases, the ASV or authentication token may be provided as part of a mutual introduction and/or delegation protocol. This approach may reduce the need for more complicated multi-message protocols such as transport layer security ("TLS") that may utilize certificates, certificate authorities, revocation and freshness services, and the like. The approach may further simplify the provisioning of things during manufacturing, as keys and certificates may not need to be provisioned at the factory. In some embodiments, instead of using certificates to authenticate security associations, trusted web services and/or peer-to-peer delegation protocols may be used, where new peers and/or controllers are introduced to things by already trusted entities.

In some example embodiments, shared keys may be derived from DH key pairs, as, e.g., explained in the '493 patent, as a hash $H((x\hat{0}r1)\hat{0}r2)$ mod p, ASV), where $x\hat{0}r1$ is a public key from an external entity, r2 is a thing's DH private key, and an ASV is a token received separately. In some embodiments, the ASV may be received as part of a SAMP delegation protocol. Other embodiments may utilize elliptic curve cryptography. In some embodiments HO may comprise a US National Institute of Standards and Technologies Secure Hashing Algorithm ("SHA").

In some embodiments, transmit and receive message sequence counts may initially be set to zero and may be incremented each time a message is sent and/or received by an associated thing. In some embodiments, these counts may be used to defeat replay attacks where messages from one entity to another may be spoofed by replaying legitimate messages that were transmitted previously. In some embodiments, messages between IoT entities may be authenticated using a keyed hashed message authentication code ("HMAC") that may use a current shared cryptographic key and/or a sequence number of the message.

In certain embodiments, the security association tables of all of the things and/or other entities associated with a user (e.g., a thing owner) may be utilized to illustrate an EPN associated with the user's personal IoT. For example, such an illustration could be maintained by a cloud service connected to the personal IoT, as described above.

SAMP Messages

As described above, a simple pairing protocol may allow two things to form a security association. For example, a user may acquire a home appliance and want to control it using his or her smartphone. The smartphone may have a personal IoT management application and both the smartphone and the appliance may be capable of communicating using a common proximal field communication interface such as, for example, NFC. Using this capability, the smartphone may set up an NFC communication channel and the two devices may exchange SAMP messages containing public keys and form a shared key. The appliance may not have an owner and, accordingly, the smartphone may take ownership of the appliance and provide a group key associated with the owner of the smartphone and one or more group keys establishing the appliance as a member of one or more groups.

Trust may initially be established based on the proximity of the smartphone to the appliance and the appliance having no previous owner. Other protocols may be established that may allow disownership of a thing, as may be useful in the case of, e.g., a second-hand sale, and/or to allow retailers to have ownership until they are disowned at a point of sale. Once ownership is established and group keys are provisioned to the thing, the thing may establish security associations with other things in the group directly and/or indirectly using other control devices associated with the owner (e.g., using a smartphone and/or one or more cloud-based controllers or services).

When two or more things in a personal IoT have been paired to the same owner (e.g., a common smartphone using a proximity-limited protocol and/or the like), the two things can pair directly to one another using SAMP messages that may not necessarily require proximity, by using group tokens (e.g., group tokens for ASVs). For example, when a new thing is brought into a home, once it is identified with an owner or a thing group, it may pair automatically with other things in the home using automatic discovery protocols. In certain embodiments, additional authentication protocols may be utilized to prevent entities from maliciously claiming things and/or pairing with things that they are not entitled to claim and/or pair with.

In some embodiments, security associations within a personal IoT may be backed up to a cloud-based service. In certain embodiments, the service performing the backup may be part of the personal EPN of security associations. Among other functions, the service may be authorized to backup, re-initialize, and/or repair secure associations of things and/or other devices and/or systems associated with the personal IoT.

Delegation Protocol

An owner of a thing may wish to delegate control of and/or the ability to receive data from the thing for a variety of reasons. For example, an owner of a thing may wish to:

Provide access to capabilities of the thing to other members of a household.

Control the thing using other devices (e.g., from a tablet computer and/or a new smartphone).

Allow the thing to interact with a cloud service in some restricted way. For example, this may enable the cloud service to configure and deploy trust relationships among things so that they can be part of a composite thing, in which case the cloud service may enable peer relationships and/or groups and carry out SAMPs.

In certain embodiments, owners may have significant control of associated things. Using security associations, an owner may safely send authenticated SAMP messages to devices they "own" from anywhere on the Internet that can establish connectivity with the thing, and they may set policy that may, among other things, require auxiliary conditions for various interactions with the thing, such as proximity or locality, even restricting their own permissions for security sake. SAMP messages may comprise special commands that may modify various parameters in a thing's security association list and/or table. In some embodiments, a thing with a security association list and/or table that only contains manufacturer entities may be considered a new thing that can be owned by anyone who initially pairs with the thing. Entities such as, for example, retailers and/or others in a distribution chain, may lock things by establishing temporary ownership, which may be undone quickly at a point of sale and/or a shipping center using, for example, an unpair protocol.

Unpair Protocol

An unpair protocol may comprise one or more simple authenticated SAMP messages that may allow security associations to be removed from a device and allow things to be disowned, thereby allowing other owners to take control of the thing. In some embodiments, unpairing and/or disownership may require that an owner's security association be involved. Other embodiments may allow secure association deletions that do not require involvement of an owner security association.

Personal IoT Commands

Personal IoT commands and/or requests may comprise one or more structured messages. In certain embodiments, such messages may, for example, comprise, without limitation, some or all of the following:

Destination entity identification.
Command type.
Command body.
Message sequence number.
HMAC (e.g., a keyed HMAC where the key used may be found in the security association list of both the source and destination devices).

Responses to personal IoT commands and/or requests may comprise structured acknowledgement messages that may, for example, include, without limitation, some or all of the following:

Destination entity identification.
Acknowledgement indications.
Message sequence number of the message that provoked the acknowledgement message.
Message sequence number of the acknowledgement message.
HMAC Responses for data requests (e.g., to poll for sensor data or the like) may further include a data bearing field. In certain embodiments, this field may be encrypted with the security association shared key. Personal IoT protocols may use relatively simple command-response pairs. Pairing protocols may involve an exchange of unauthenticated messages and/or bidirectionally authenticated acknowledgement messages using a security association formed in the pairing protocol.

Data Flow Protocol

Personal IoT protocols consistent with embodiments disclosed herein may facilitate straightforward participation of things that may comprise sensors that a user would like to use to securely deliver data to a cloud service. In this case, a thing may have factory installed keys that may allow data to be encrypted at the source and then transmitted to the cloud service through various means (e.g., gateways, memory card transfers, etc.). In such an instance, the thing may use a manufacturer-generated security association. Data generated from the thing may flow to a website and then be redirected. When a user buys such a thing, they can register the thing, set up a security association with the manufacturer, and then specify a service point to which the data is to be redirected.

In an embodiment of the above example, a relatively simple security protocol implementation may be used that utilizes a manufacturer provisioned security association, requiring only the ability to encrypt using a static key, and then allowing data to flow under direction of the registered owner of the thing using cloud services with cloud resident entities that may securely communicate using personal IoT security associations.

Utility Data Flows

Certain embodiments of the personal IoT disclosed herein may provide a means for certain data generated by things to flow to public utilities under the direction of an owner of the thing that produces the data. In some embodiments, this may be achieved by allowing service centers for such utilities to be explicitly named into personal IoT groups established at the behest of the owner of an associated thing.

Cloud Services and Performance Aids

In certain embodiments, cloud services may function as proxies for owners and may, for example, establish security associations for device owners, set permissions, assure permissions are properly matched to delegate characteristics, and/or provide visualizations of a logical EPN associated with a personal IoT (e.g., a graph showing delegation paths and/or implied permissions).

Entities in the EPN

As previously indicated, a personal IoT EPN may include various things, such as those illustrated in FIGS. 1 and 5, and also may include other entities, such as Personal Portable Devices (for example, mobile phones, tablets, and laptops) as well as network gateway devices, and web or cloud services. These entities may comprise virtually any web connected device or service that has the ability to maintain at least a primitive list of security associations, and provide services for data or control that have an access layer that controls access to those services. This multitude and heterogeneity of entities provides advantages for the personal IoT and its EPN features, as it allows more capable devices and services to provide aid and/or to become proxies for less capable devices while still preserving TPSS properties. Simple configurations of things (such as home light switches and loads, water and HVAC sensors, etc.) can participate in the personal IoT and share TPSS features without having to implement heavy duty security protocols or implement Internet connectivity or common networking capabilities. They can communicate based on different signal capabilities in the home, automobile, or other venue of the personal IoT, for example, by using low power radio communication, signal modulation over powerline, etc. Moreover, they need not implement all of the messaging capabilities for SAMP; however, in preferred embodiments, they are able to provide entity identifications, check the source and integrity of commands, and protect data they collect using methods compatible with those described herein. A personal IoT in accordance with certain embodiments disclosed herein includes features that are designed to allow and support inclusion of simple devices, while taking steps to ensure that weak links cannot be exploited for the purpose of attacking more valuable parts of a system.

Function of Group Tokens

In certain embodiments, device group tokens are used to help support the inclusion of simple devices and to help simplify administration. User group tokens make it easy to support multiple users and administrators, as well as enabling the use of smarter appliances and services to coordinate and control other devices, and to provide proxy services and better and more helpful interfaces that can be updated independently of the things that they can represent.

As one illustrative example, consider the situation where a person brings home an appliance that includes user controls that fit naturally as part of a device group, and the person wants to make the appliance accessible to others in the household. Certain embodiments of the personal IoT and EPN systems and methods described herein can be used to make that both simple and safe. For example, the appliance's packaging may explain that it has personal IoT capabilities and a QR code that permits the immediate acquisition of a personal IoT smartphone application if the person does not already have one. Using the personal IoT application, the person taps his or her phone on a designated place on the appliance (e.g., activating a Near Field Communication protocol), and the appliance's discovery layer makes available a number of services. The first is an information service providing manufacturer's information for the appliance (including information to be included in an SA). The personal IoT application uses that information to connect with a web service for the manufacturer, and if the person has not previously registered with this manufacturer, it establishes an SA between the portable device and the manufacturer's services. In this example, standard web protocols (including, e.g., HTTP-S) can help establish trust, but an SA is established that can permit more personalized services. In particular, in some embodiments, the person's smartphone receives a script that makes setup of the appliance, including the SA with the device, very simple and convenient with minimal effort on the part of the user. In particular, in one embodiment, an SA is set up between the appliance and the smartphone. This is done as the discovery protocol interacts with the appliance's personal IoT access layer and makes the owner SAMP service available, since the access layer's SA table has no owner SAs. In one embodiment, the person's phone, running the personal IoT application, carries out the SAMP procedure, which the discovery layer only makes available through a proximity-limited communications interface (e.g., NFC, in this example). In this case the procedure is driven by a script received from the manufacturer's website. In executing the script, it is noted that this appliance naturally wants to share information with other appliances and therefore belongs in a device group, and that the appliance has several controls and sensors that have permissions. Some of the controls have safety implications, and so it is recommended that two user groups be set up. One is for adults and the other for children. The script drives the SAMP protocol and the appropriate group tokens are generated and included in the SA, and the person is established as the appliance's owner and the appliance is included as part of his or her personal IoT.

In this example, after the owner SAMP procedure is completed, the appliance's discovery layer will now allow services that permit commands to be issued and data to be collected, but the access layer only permits the owner to issue commands and collect data. However, the discovery layer in the appliance now changes behavior and allows other things to discover it through all communications interfaces, not just proximity limited interfaces. In particular, discovery will make services available allowing other devices to pair with it. However, the access layer will only permit SAs to be set up with devices that are in the appliance's device group, and with control devices (such as PPDs) that are owned by people in one of the user groups designated by the owner (or subsequently a delegate of the owner with proper permissions). Further, in this example embodiment, commands and requests will only be accepted by the appliance from members of these groups. The personal IoT methods allow distributed, peer-to-peer establishment of these device and user group relationships. The owner of the new appliance, after setting up an SA with the appliance can now bring home additional devices and provide them with device group membership that will allow them to self-configure using safe discovery protocols. Also, the owner can now give his or her children appliance control capabilities limited to safe commands by using a SAMP delegation protocol that allows their PPDs to join a family user group with restricted permissions. When the children seek to use the appliance, the discovery layer in the appliance can sense the restrictions and only make certain services available, and the children's devices will be able to pair with the appliance forming an SA that is authenticated with the restricted user group token as the ASV. It is in this way that a personal IoT allows thing owners to make introductions of others to new things. It allows automatic discovery and pairing protocols to proceed whereby devices can say to one another that "I am a member of the Smith family appliance group", or "I am one of the Brown family children". In preferred embodiments, authentication of these statements during pairing and during command integrity verification is extremely robust, yet very simple. Strong TPSS capabilities are established using performance aids that can take advantage of all of the power of modern smartphone and web services, and administration of the SAs and performance of the protocols are simplified and automated for users.

In the example described above, the SA between the person's smartphone and the manufacturer (different from the SA and the new appliance), can be used for the manufacturer to receive certain data from the device. But this is, by default, under the control of the user (the new appliance owner). One other capability for a personal IoT that can make this safer and more convenient for the user of the appliance is for that person to establish a relationship with a consumer service that can provide services from many manufacturers but which is more responsive to the consumer, especially regarding sharing sensor information from various things, including home appliances with sensors that collect information the consumer wants to keep private. This consumer service can, for example, appropriately filter the information and, for example, share product reliability information with a manufacturer, utility usage information (say more fine-grained electrical usage that may qualify for rebates) with a local utility provider, and it can assemble and analyze sensor data from many devices, provide alerts to designated family members who want to ensure the safety and well-being of an elderly parent, and/or the like. This consumer service can aid people in understanding who has access to what controls and data, and it can make that information explicitly available to very specific people.

Figure 9:
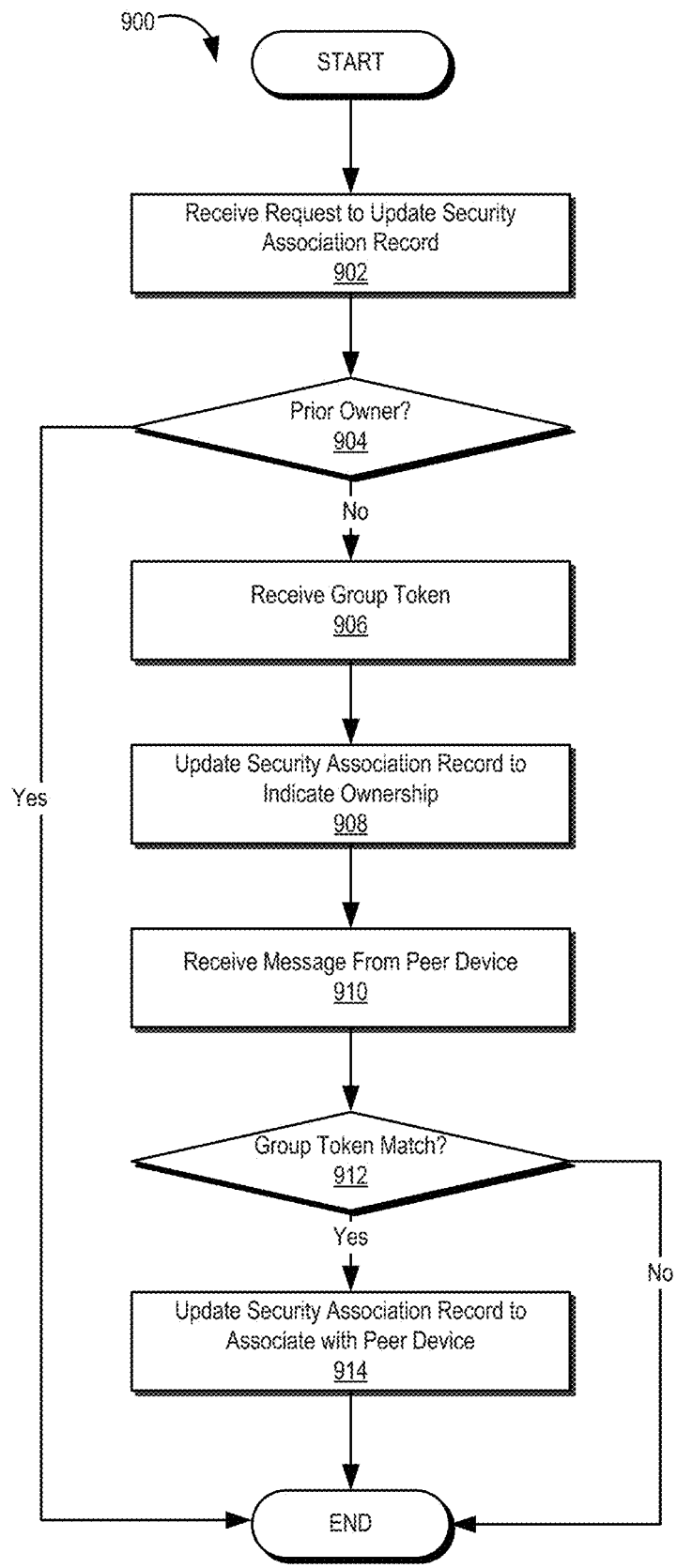
FIG. 9 illustrates a flow chart of an exemplary method of managing a connected device consistent with embodiments of the present disclosure.

FIG. 9 illustrates a flow chart of an exemplary method 900 of managing a connected device consistent with certain embodiments of the present disclosure, such as the example described above. The illustrated method 900 may be implemented in a variety of ways, including using software, firmware, hardware, and/or any other combination thereof. In certain embodiments, the method 900 and/or any of its constituent steps may be performed by a connected system, device, and/or thing, and/or any other suitable system or systems.

At 902, a request may be received to update a security association record associated with the connected device. In certain embodiments, the request may be received from another device associated with an entity (e.g., a user, a group of users, an organization, etc.) such as, for example, a smartphone. In some embodiments, the request may be received via a proximal field communications channel such as, for example, a NFC and/or a BLE communications channel.

A determination may be performed at 904, based on the contents of the security association record, as to whether the connected device is associated with an entity and/or an owner. If the connected device is not associated with an entity and/or owner (e.g., as may be the case with a new device that has not been previously claimed by an owner), the method 900 may proceed to 906. Otherwise, the method 900 may terminate.

At 906, a first group token may be received by the connected device from the other device (e.g., the smartphone). In certain embodiments, the first group token may be associated with the entity. The security association record may be updated at 908 to indicate that the connected device is now associated with the entity. In certain embodiments, the first group token may be stored as part of the security association record.

At 910, a message may be received from a peer connected device. In some embodiments, the message may comprise a second group token. A determination may be performed at 912 to determine whether the first group token and the second group token match (e.g., whether both group tokens are associated with the same entity). If the tokens match, the method 900 may proceed to 914, where the security association record may be updated to indicate that the peer connected device is also associated with the first entity. Otherwise, the method 900 may proceed to terminate.

Figure 10:
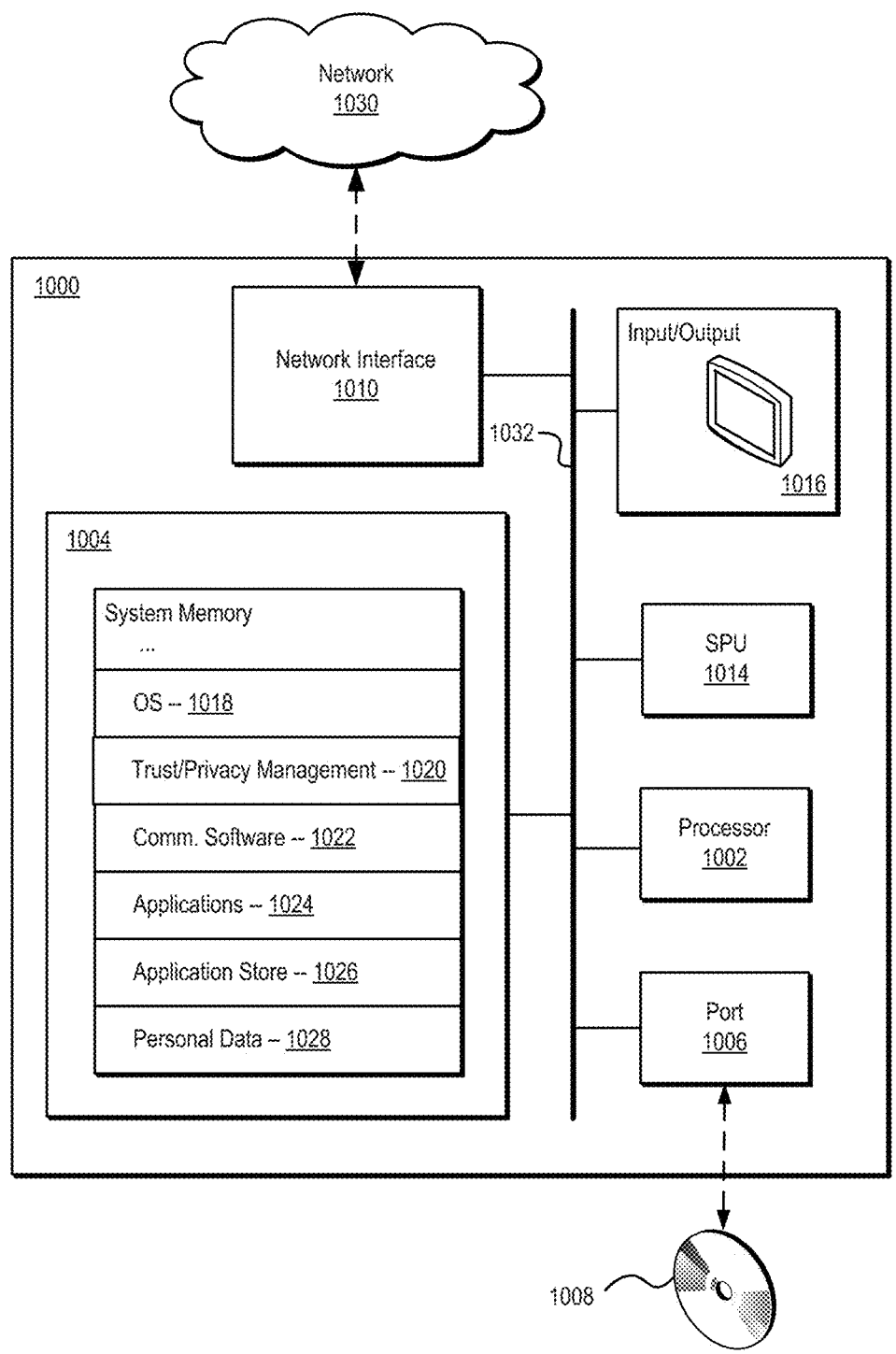
FIG. 10 illustrates an exemplary system that may be used to implement embodiments of the systems and methods of the present disclosure.

FIG. 10 illustrates an exemplary system 1000 that may be used to implement embodiments of the systems and methods disclosed herein. The exemplary system 1000 may comprise a system, device, and/or thing associated with a user and/or a personal IoT and/or EPN, a service provider system (e.g., a cloud service provider system), and/or any other system configured to implement embodiments of the systems and methods disclosed herein. As illustrated in FIG. 10, the system 1000 may include: a processing unit 1002; system memory 1004, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 1002; a port 1006 for interfacing with removable memory 1008 that may include one or more diskettes, optical storage mediums (e.g., flash memory, thumb drives, USB dongles, compact discs, DVDs, etc.) and/or other non-transitory computer-readable storage mediums; a network interface 1010 for communicating with other systems via one or more network connections 1030 using one or more communication technologies; a user interface 1016 that may include a display and/or one or more input/output devices such as, for example, a touchscreen, a keyboard, a mouse, a track pad, and the like; and one or more busses 1032 for communicatively coupling the elements of the system 1000. In certain embodiments, the system 1000 may include and/or be associated with one or more sensors (not shown) configured to collect various device data, including any of the types of sensors disclosed herein.

In some embodiments, the system 1000 may, alternatively or in addition, include a SPU 1014 that is protected from tampering by a user of system 1000 or other entities by utilizing secure physical and/or virtual security techniques. An SPU 1014 can help enhance the security of sensitive operations such as personal information management, trusted credential and/or key management, privacy and policy management, and other aspects of the systems and methods disclosed herein. In certain embodiments, the SPU 1014 may operate in a logically secure processing domain and be configured to protect and operate on secret information, as described herein. In some embodiments, the SPU 1014 may include internal memory storing executable instructions or programs configured to enable to the SPU 1014 to perform secure operations, as described herein.

The operation of the system 1000 may be generally controlled by processing unit 1002 and/or SPU 1014 operating by executing software instructions and programs stored in the system memory 1004 (and/or other computer-readable media, such as removable memory 1008). The system memory 1004 may store a variety of executable programs or modules for controlling the operation of the system 1000. For example, the system memory 1004 may include an operating system ("OS") 1018 that may manage and coordinate, at least in part, system hardware resources and provide for common services for execution of various applications and a trust and privacy management system

1020 for implementing trust and privacy management functionality including protection and/or management of personal data through management and/or enforcement of associated policies. The system memory 1004 may further include, without limitation, communication software 1022 configured to enable in part communication with and by the system 1000, applications 1024 (e.g., installed applications utilized in connection with personal data 1028), an application store interface 1026 configured to enable a user to select and/or install applications they wish to utilize in connection with their personal data 1028, personal data 1028 associated with a user, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may, for example, be embodied by a compact disk, digital-video disk, a magnetic tape, a magnetic disk, flash memory, integrated circuits, or any other non-transitory digital processing apparatus or storage device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of controlling an operation of a second connected device using a first connected device, the method comprising:
   receiving, by a first connected device, a request to control an operation of a second connected device;
   accessing, using information included in the request, explicit private network state information associated with the second connected device;
   determining, based on the explicit private network state information associated with the second connected device, that first connected device may control the operation of the second connected device in accordance with the request;
   generating, based on the determination, a command message configured to control the operation of the second device in accordance with the request; and
   transmitting the command message to the second connected device.

2. The method of claim 1, wherein accessing the explicit private network state information associated with the second connected device comprises accessing explicit private network state information associated with the second connected device based on identification information associated with the second connected device included in the request.

3. The method of claim 2, wherein the identification information is further included in the explicit private network state information associated with the second connected device.

4. The method of claim 2, wherein the identification information is uniquely associated with the second connected device.

5. The method of claim 4, wherein the identification information comprises at least one of a device universally unique identifier and Internet protocol identification information.

6. The method of claim 2, wherein the identification information comprises a name assigned to the second connected device by an associated entity.

7. The method of claim 1, wherein the explicit private network state information associated with the second connected device comprises information relating to acceptable commands associated with the second connected device.

8. The method of claim 7, wherein determining that first connected device may control the operation of the second connected device in accordance with the request comprises determining that the request is associated with at least one acceptable command of the acceptable commands associated with the second device.

9. The method of claim 7, wherein generating the command message comprises generating the command message based, at least in part, on the information relating to acceptable commands associated with the second device.

10. The method of claim 1, wherein the explicit private network state information associated with the second connected device comprises information relating to acceptable data that may be communicated to the second connected device.

11. The method of claim 10, wherein generating the command message comprises generating the command message based, at least in part, on the information relating to acceptable data that may be communicated to the second connected device.

12. The method of claim 1, wherein the method further comprises:
    receiving, by the first connected device, a response message from the second device generated by the second device in response to the command message.

13. The method of claim 12, wherein the method further comprises:
    updating the explicit private network state information associated with the second connected device based, at least in part, on the response message.

14. The method of claim 1, wherein accessing the explicit private network state information associated with the second connected device comprises accessing the explicit private network state information associated with the second connected device from storage of the first connected device.

15. The method of claim 1, wherein accessing the explicit private network state information associated with the second connected device comprises accessing the explicit private network state information associated with the second connected device from a remote trusted service.

16. The method of claim 1, wherein the request to control the operation of the second connected device is received from a user interface of the first connected device.

17. The method of claim 1, wherein the request to control the operation of the second connected device is received from a communications interface of the first connected device from a third connected device.

18. The method of claim 1, wherein the first connected device comprises at least one of a smartphone, a tablet computer system, a desktop computer system, a laptop computer system, a wearable computing device, a connected vehicle, a telematics system, a security system, a home automation system, a connected thermostat, a connected heating system, a connected cooling system, a utility meter, a medical device, a gaming system, a network infrastructure system, a television, a speaker, and a digital camera.

19. The method of claim 1, wherein the second connected device comprises at least one of a smartphone, a tablet computer system, a desktop computer system, a laptop computer system, a wearable computing device, a connected vehicle, a telematics system, a security system, a home automation system, a connected thermostat, a connected heating system, a connected cooling system, a utility meter, a medical device, a gaming system, a network infrastructure system, a television, a speaker, and a digital camera.

* * * * *